United States Patent
Glickman

(10) Patent No.: US 11,294,922 B2
(45) Date of Patent: *Apr. 5, 2022

(54) METHOD, APPARATUS, AND COMPUTER READABLE MEDIUM FOR MODELING RELATIONSHIPS BETWEEN QUERY RESPONSES IN A DATA SET

(71) Applicant: Stephen Barry Glickman, North York (CA)

(72) Inventor: Stephen Barry Glickman, North York (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,789

(22) Filed: Jun. 26, 2020

(65) Prior Publication Data

US 2021/0117411 A1   Apr. 22, 2021

Related U.S. Application Data

(63) Continuation of application No. 15/707,356, filed on Sep. 18, 2017, now Pat. No. 10,733,196.

(51) Int. Cl.
  *G06F 16/248* (2019.01)
  *G06F 16/26* (2019.01)
  *G06F 3/04815* (2022.01)

(52) U.S. Cl.
  CPC ........ *G06F 16/248* (2019.01); *G06F 3/04815* (2013.01); *G06F 16/26* (2019.01)

(58) Field of Classification Search
  CPC combination set(s) only.
  See application file for complete search history.

(56) References Cited

U.S. PATENT DOCUMENTS

| | | | | |
|---|---|---|---|---|
| 6,775,675 B1 * | 8/2004 | Nwabueze | ............. | G06Q 10/10 707/600 |
| 7,454,439 B1 * | 11/2008 | Gansner | ................. | H04L 41/22 |
| 8,225,233 B2 * | 7/2012 | Kashik | .................. | G06F 16/248 715/848 |
| 8,347,326 B2 * | 1/2013 | Weitzenfeld | ..... | H04N 21/44218 725/24 |
| 8,868,611 B2 * | 10/2014 | Chen | ..................... | G06F 16/283 707/793 |
| 9,152,695 B2 * | 10/2015 | Tibrewal | ................. | G06F 16/26 |
| 9,870,355 B2 * | 1/2018 | Hasan | .................... | G06F 40/232 |
| 2007/0239768 A1 * | 10/2007 | Quinn-Jacobs | ....... | G06F 16/248 |
| 2008/0288306 A1 * | 11/2008 | MacIntyre | ......... | G06Q 30/0201 705/7.29 |

(Continued)

*Primary Examiner* — Robert W Beausoliel, Jr.
*Assistant Examiner* — Susan F Rayyan
(74) *Attorney, Agent, or Firm* — Rahman LLC

(57) ABSTRACT

A system, method and computer-readable medium for modeling relationships between query responses in a data set including receiving a selection of one or more first queries and one or more second queries, receiving a selection of one or more first strings and one or more second strings, determining one or more representative values corresponding to one or more intersections, each intersection corresponding to a unique combination of a first query, at least one second query, a first string, and at least one second string, and generating a three-dimensional representation including one or more indicators corresponding to the one or more intersections, a visual attribute of each indicator in the one or more indicators reflecting a representative value corresponding to that intersection and the one or more indicators being organized within the three-dimensional representation along three axes.

24 Claims, 52 Drawing Sheets

(56) References Cited

U.S. PATENT DOCUMENTS

| | | | | |
|---|---|---|---|---|
| 2010/0070904 A1* | 3/2010 | Zigon | ............... | G01N 15/147 |
| | | | | 715/771 |
| 2011/0131209 A1* | 6/2011 | Bechtel | ............... | G06N 5/025 |
| | | | | 707/737 |
| 2012/0102026 A1* | 4/2012 | Fortune | ............... | G06F 16/93 |
| | | | | 707/722 |
| 2012/0102419 A1* | 4/2012 | Mital | ............... | G06T 11/206 |
| | | | | 715/765 |
| 2012/0200567 A1* | 8/2012 | Mandel | ............... | G06T 11/206 |
| | | | | 345/420 |
| 2012/0218254 A1* | 8/2012 | Abeln | ............... | G06T 11/206 |
| | | | | 345/419 |
| 2013/0179817 A1* | 7/2013 | Bak | ............... | H04L 43/0882 |
| | | | | 715/771 |
| 2013/0346911 A1* | 12/2013 | Sripada | ............... | G06T 19/003 |
| | | | | 715/782 |
| 2014/0225889 A1* | 8/2014 | Kim | ............... | G06T 11/206 |
| | | | | 345/419 |
| 2014/0258938 A1* | 9/2014 | Christmas | ............... | G06F 3/04815 |
| | | | | 715/849 |
| 2014/0282276 A1* | 9/2014 | Drucker | ............... | G06F 3/04883 |
| | | | | 715/863 |
| 2014/0282586 A1* | 9/2014 | Shear | ............... | G06F 16/24575 |
| | | | | 718/104 |
| 2015/0186447 A1* | 7/2015 | Milousheff | ............... | G06F 16/235 |
| | | | | 707/694 |
| 2015/0324469 A1* | 11/2015 | Keyngnaert | ............... | G06F 16/9535 |
| | | | | 707/706 |
| 2016/0364774 A1* | 12/2016 | Wittsiepe | ............... | G06Q 30/0282 |
| 2017/0169448 A1* | 6/2017 | Huang | ............... | G06Q 30/0203 |
| 2018/0203917 A1* | 7/2018 | Marshall | ............... | G06F 16/285 |

\* cited by examiner

| Based on | Sector > Subsector | Electorate / Dataset > Sector |
|---|---|---|
| Personal submission | 1) Academia<br>  a) College<br>  b) Elementary school<br>  c) Online school<br>  d) University<br>2) Financial<br>  a) Consultancy<br>  b) Cooperative<br>  c) Distributor<br>  d) Management agency<br>  e) Online (IT) service<br>  f) Rental agency<br>  g) Restaurant<br>  h) Retail / Store<br>3) Military<br>  a) Personnel<br>4) Political<br>  a) Candidate<br>  b) Non-governmental organization<br>  c) Party<br>  d) Politician<br>  e) Referendum<br>5) Social<br>  a) Assembly<br>  b) Club<br>  c) Family<br>  d) Gallery<br>  e) Online<br>6) Team<br>  a) Artist(s)<br>  b) Sports team<br>7) Psychology<br>  a) Clients | 1) Administrators<br>  a) Academia<br>  b) Financial<br>  c) Incarcerated<br>  d) Political<br>  e) Team<br>2) Artists / Musicians<br>  a) Team<br>3) Board of Directors<br>  a) Financial<br>4) Classroom<br>  a) Academia<br>5) Clients<br>  a) Financial<br>6) Friends<br>  a) Social (future plans: Facebook plugin)<br>7) General public<br>  a) Academia<br>  b) Financial<br>  c) Incarcerated<br>  d) Military<br>  e) Political<br>  f) Social<br>  g) Team<br>8) Individual<br>  a) Psychological evaluation: Query tags map replies onto specific overlapping character / personality traits, in order to be treated as separate voters / participants / voices / expressers.<br>9) Inmates<br>  a) Incarcerated<br>10) Members<br>  a) Financial<br>  b) Political<br>  c) Social<br>11) Players<br>  a) Team<br>12) Shareholders<br>  a) Financial<br>13) Soldiers<br>  a) Military<br>14) Staff<br>  a) Financial<br>15) Teachers<br>  a) Academia |

| Directly on dataset | 1) Scientists<br>   a) Climate<br>   b) Geology<br>2) Financial<br>   a) Investing<br>   b) Marketing<br>   c) Sales<br>   d) Analysists<br>3) Medical<br>   a) Single patient biometrics<br>   b) Laboratory results<br>   c) Clinical study | 1) Company data<br>   a) Investors<br>   b) Analysists<br>2) Market indicators<br>   a) Investors<br>   b) Analysists<br>3) Modelling data<br>   a) Scientists<br>   b) Analysists<br>4) Sports statistics<br>   a) Coaches<br>   b) Trainers |

| Axis | Contents |
|---|---|
| X | Express queries |
| Y | Express strings |
| Z | Impose queries #1 |

| Layer | Contents |
|---|---|
| 1 | Single impose string #1 |

| Axis | Contents |
|---|---|
| X | Impose queries #1 |
| Y | Impose strings #1 |
| Z | Express strings |

| Layer | Contents |
|---|---|
| 1 | 2 compared express queries |

| Axis | Contents |
|---|---|
| X | Express queries |
| Y | Express strings |
| Z | Impose queries #1 |

| Layer | Contents |
|---|---|
| 1 | Single impose string #1 |
| 1 | 2 compared impose strings #1 |
| 2 | 2 compared impose queries #2 |

| Axis | Contents |
|---|---|
| X | Impose queries #1 |
| Y | Impose queries #2 |
| Z | Impose queries #3 |

| Layer | Contents |
|---|---|
| 1 | 2 compared impose strings #1 |
| 1 | 2 compared impose strings #2 |
| 1 | 2 compared impose strings #3 |
| 1 | 2 compared impose strings |
| 1 | 2 compared express strings |
| 2 | Single impose string #1 |
| 2 | Single impose string #2 |
| 2 | Single impose query #3 |
| 2 | Single impose string #4 |
| 2 | Single express query |
| 2 | Single express string |

| Axis | Contents |
|---|---|
| X | Express queries |
| Y | Express strings |
| Z | Impose queries #1 |

| Layer | Contents |
|---|---|
| 1 | Single impose string #1 |
| 1 | Single impose query #2 |
| 1 | Single impose string #2 |

Fig. 3B

| Tagger types | Query tags | String tags |
|---|---|---|
| 1) Editors | 1) Opinion | 1) External |
| 2) Friends | 2) Internal | 2) Need |
| 3) Members | 3) External | 3) Responsibility |
| 4) Staff | 4) Direction | 4) Moderation |
| 5) Participants | 5) Scale | 5) Extremes |
| 6) Public | 6) Measurement | 6) Equality |
| | 7) Environment | 7) Chance |
| | 8) Performance / score | 8) Internal |
| | 9) Physical attribute | 9) Passionate |
| | 10) Personal preference | 10) Calm |
| | 11) Psychological | 11) Neutral |
| | 12) Success | |
| | 13) Failure | |
| | 14) Leadership | |
| | 15) Support | |
| | 16) Superego | |
| | 17) Earnings | |
| | 18) Capital | |

| Query tag | String tag |
|---|---|
| Scale | Need |
| Measurement | Responsibility |
| Environment | Moderation |
| Performance / score | Extremes |
| Physical attribute | Equality |
| Personal preference | Chance |

401A

| Query tag | String tag |
|---|---|
| Opinion | Passionate |
| Internal | Calm |
| External | Neutral |
| Directional | Equality |
| Psychological | |

401B

| Query tag | String tag |
|---|---|
| Earnings | Equality |
| Capital | Passion |
| Investment | Calm |
| Expenses | Moderation |
| Capital | Extremes |
| Liability | Neutral |

| Data retrieval | Wizard | Term | Source | Example |
|---|---|---|---|---|
| Personal submission | Focus group | Survey / Poll | Exercise | University of Cartagena's Cultural Program |
| | | Opinion | Express query | Rate how you feel about... |
| | | Response Scale | Express query reply | 4.5 stars |
| | | Measurement | Impose query | Hair color |
| | | Participants | Impose query reply Count | Brown |
| | Financial | Performance | Express query | Dividends per quarter... |
| | | Differentiator | Impose query | Franchise location |
| Directly on Dataset | Psychological | Personality trait | Impose query | People listen to me more when I yell. |

| Problem | Goal | String | Description Expressed (first) queries | Example |
|---|---|---|---|---|
| Domination by the most passionate | Moderation | | In queries based on a feedback (intensity at edges with neutral in the middle) by amplifying the moderate replies and diminishing the extreme replies it's possible to see how the moderates responded. | In a political sector, using stability strings can project how the undecided feel about the issues and candidates. |
| Mob rule by centralists | Change | | In queries based on a feedback (intensity at edges with neutral in the middle) by amplifying the extremes it's possible to predict how the more passionate and outspoken might at some time stand out as leaders of the rest. | In a marketing campaign, applying the change string can help illuminate where are the future leaders and trends. |
| Disorganized by wild swings to extremes | Neutrality | | In queries based on a feedback (intensity at edges with neutral in the middle) by amplifying the replies closest to, and equal to, neutral it's possible to see where there's the most apathy in the group. | In a business application, the neutrality string can be used to illuminate where there's the least amount of motivation in a set of data. |

| Problem | Goal | String | Description | Example |
|---|---|---|---|---|
| | | | Imposed (second) queries | |
| Chaos | Stability | | By amplifying the voices of the middle of the group (depending on which scale / imposed query is used) it's possible to predict the direction of the group by diminishing some of the 'outer' / radical ideas that the extremes are usually better at generating. | In a third world country use stability strings politically to amplify the voice of the relatively small middle class in order to find solutions that are more far sighted and long lasting. |
| Stagnation | Change | | By amplifying the voices of the extremes of the group (depending on which scale / imposed query is used) it's possible to discover radical ideas that are often 'drowned out' by the much in the middle (assuming that the scale produces a majority of voters in the middle of that scale). | In a marketing campaign for tennis shoes, amplify the customers who have extra small or large feet to find out how to redesign the shoes in order to accommodate all sizes. |
| Disorganized | Cooperation, Cohesion | | By amplifying the voices of those lower end of the chosen group (depending on which scale / imposed query is used) and giving them more power over the decision making process, it's possible to 'hand' the group together and force them to cooperate more. | In a school classroom that's consistently showing poorer performing students lack of motivation, dropping out or acting out and disrupting the lessons, giving more power to the failing students over the direction of the class forces the rest of the students to try refocus their attention on others and motivate them to participate and make different decisions as their bad attitude and ideas effects everyone even more than before. |
| Unopposed | Competition, Innovation | | By amplifying the voices of those higher end of the chosen group (depending on which scale / imposed query is used) and giving them more power over the decision making process, it's possible to further alienate or disenfranchise those in the middle and / or at the end and force them to try and change their positions in order to be heard. | In a business sales group that's becoming dominated by a certain geographical region, amplifying their say can tap into what kinds of different approaches they use and force the other geographical regions to either adapt or excel in have a say in their future. |
| Resentment | Equality, Harmony | | By receiving every voice or reply as having equal weight, it reinforces the idea that they are all equally important. | In a trial, all jurors (once chosen) are treated equal and must reach a unanimous decision in order to all each of the 12 to feel free to express their opinions to the fullest. |
| Desperation | Risk, Faith | | By using a random number to allocate the amplification of replies, it is possible to generate a lot of possible hypotheticals (in order to luck-into correlationships) or else to play upon the participant's illusion of control and try to enhance their efforts to decide well. | Jury selection and military draft is done on a random basis in order to make those chosen feel either lucky or unlucky, but not able to reject the decision as it just as easily could have been anyone else. In seemingly chaotic systems, data can be correlated in random patterns in order to try and find order among the replies. |

Fig. 6B

| Personal submission<br>In surveys / polls posed as<br>questions to people | Directly on Dataset<br>There are a variety of file formats which can be imported or linked to the information driving the matrix |
|---|---|
| 1) Website page<br>   a) Embedded online form<br>   b) Email message<br>   c) Kiosk entry<br>   d) Stand-alone executable program<br>   e) Application plugin | 1) Data files<br>   a) Dbase (*.dbf)<br>   b) MS Access (*.mdb, *.accdb)<br>   c) Paradox (*.db)<br>   d) ODBC<br>   e) OpenOffice (*.odb)<br>2) Spreadsheets<br>   a) Excel (*.xls, *.xlsx)<br>   b) OpenOffice (*.ods)<br>   c) QuattroPro (*.wql)<br>   d) Lotus 1-2-3 (*.wkl)<br>   e) Tables<br>   f) HTML (*.htm; *.html)<br>   g) Text (*.txt, *.csv)<br>3) Etc.<br>   a) XML (*.xml)<br>   b) ODBC<br>   c) Sharepoint<br>   d) Data services |

Fig. 11A

| Computational<br>Numeric values used in the matrix to correlate to other reply sets | Referential<br>Associative values used for including for referencing relational details later on |
|---|---|
| 1) Taken directly from a text field (measurement).<br>2) Taken indirectly from corresponding index in a lookup table:<br>   a) Multiple choice<br>   b) Dropdown list<br>   c) Ranking<br>   d) Rating:<br>      i) Stars<br>      ii) Balloons<br>      iii) Emoticons | 1) Document upload<br>2) Image<br>3) Link<br>4) Multiline rich text fields like comments / etc. |

Fig. 11B

```
┌─────────────────────────────────────────────────────────────┐
│ Assign the plurality of values to a plurality of locations  │
│ on the first axis, each location corresponding to a point   │
│ in the plurality of points of the first string which is the │
│ closest point to that location                              │
│                                                             │
│                          1201                               │
└─────────────────────────────────────────────────────────────┘
                              │
                              ▼
┌─────────────────────────────────────────────────────────────┐
│ Assign a numerical value to each first response in the set  │
│ of first responses                                          │
│                                                             │
│                          1202                               │
└─────────────────────────────────────────────────────────────┘
                              │
                              ▼
┌─────────────────────────────────────────────────────────────┐
│ Weight the numerical value assigned to each first response  │
│ in the set of first responses by a magnitude of the point   │
│ of the first string which corresponds to the location of    │
│ the value indicated by that first response to generate a    │
│ weighted set of first responses                             │
│                                                             │
│                          1203                               │
└─────────────────────────────────────────────────────────────┘
```

Fig. 12

Assign the plurality of second values to a plurality of locations on the second axis, each location corresponding to a point in the plurality of points of the second string which is the closest point to that location

1701

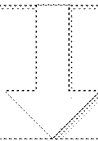

Assign a second numerical value to each second response in the set of second responses

1702

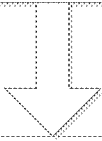

Weight the second numerical value assigned to each second response in the set of second responses by a magnitude of the point of the second string which corresponds to the location of the second value indicated by that second response to generate a weighted set of first responses

For each source in the plurality of sources, re-weight the weighted first response of that source to the first query by the weighted second response of that source to the at least one second query

2101

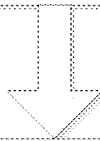

Compute a plurality of total quantities corresponding to the plurality of values received in response to the first query by summing all re-weighted first responses which correspond to the same value

2102

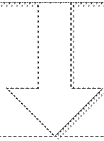

Determine a representative value from the plurality of values based at least in part on the plurality of total quantities

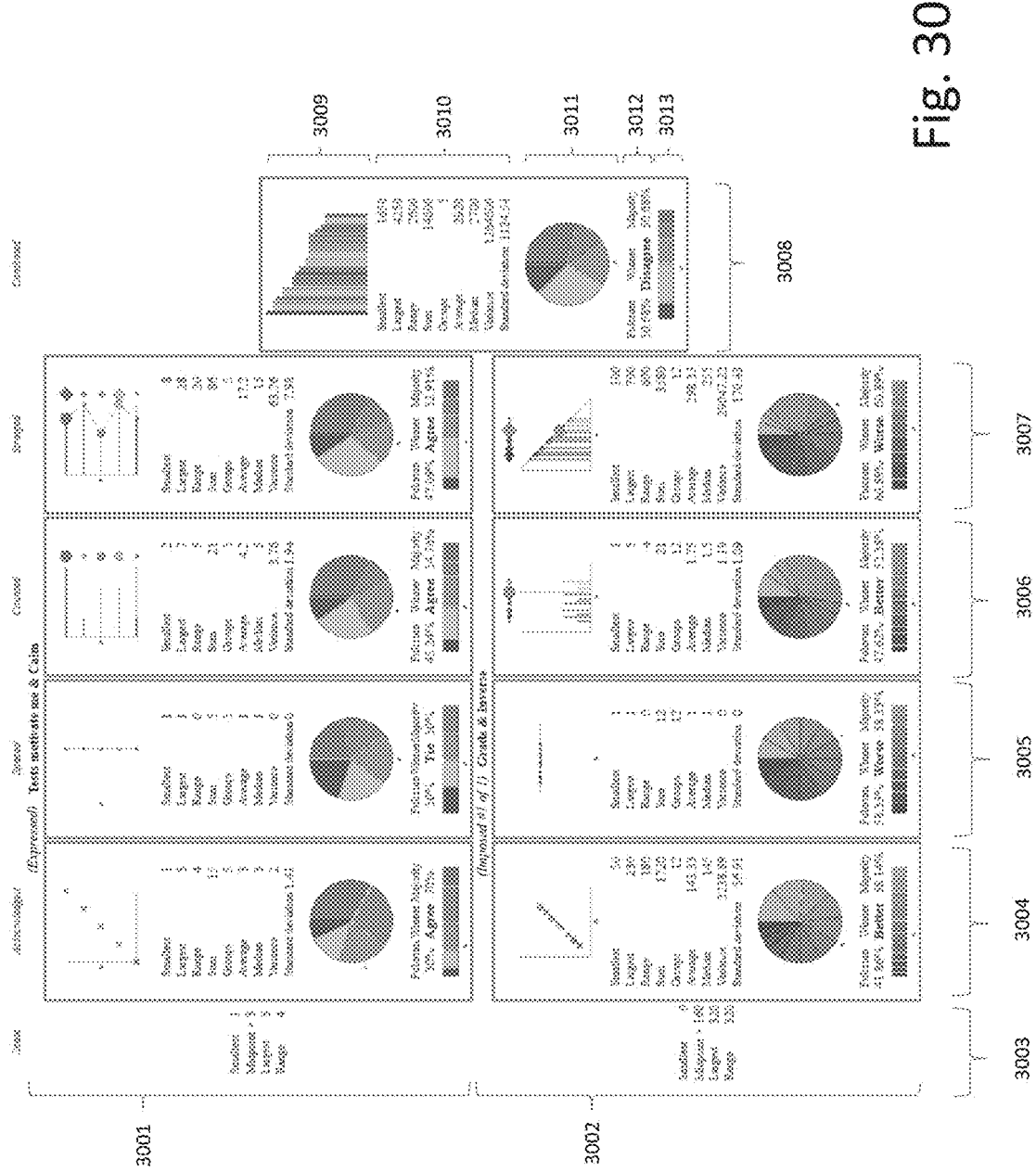

Sequential animation frame placement

| Index | Stringed value | Frame placement (10 second animation) |
|---|---|---|
| 0 | 2 | 0 |
| 1 | 4 | 2 |
| 2 | 6 | 4 |
| 3 | 7 | 6 |
| 4 | 10 | 8 |

| Index | Stringed value | Frame placement (10 second animation) |
|---|---|---|
| 0 | 0.04 | 0 |
| 1 | 0.05 | 2 |
| 2 | 0.8 | 4 |
| 3 | 1.2 | 6 |
| 4 | 2.4 | 8 |

Fig. 33C

Value based animation frame placement

| Index | Stringed value | Frame placement (10 second animation) |
|---|---|---|
| 0 | 2 | 0 |
| 1 | 4 | 2.5 |
| 2 | 6 | 5 |
| 3 | 7 | 6.25 |
| 4 | 10 | 10 |

| Index | Stringed value | Frame placement (10 second animation) |
|---|---|---|
| 0 | 0.04 | 0 |
| 1 | 0.05 | 0.04 |
| 2 | 0.8 | 3.22 |
| 3 | 1.2 | 4.92 |
| 4 | 2.4 | 10 |

Fig. 33D

Animate plane examples a. Z-planes are equal to months of the year and A-planes are equal to years (three-dimensional representation of monthly survey data *transitioning annually*).

b. Z-planes are equal to years and A-planes are months of the equal to year (three-dimensional representation of monthly survey data *transitioning through the months of the year*).

c. Z-planes are equal to earnings queries and A-planes are equal to years (three-dimensional representation of financial data *transitioning annually*).

d. Z-planes are equal to years and A-planes are equal to earnings queries (three-dimensional representation of financial data *transitioning through success rates*).

e. X-planes are equal to longitude and A-planes are equal to years (three-dimensional representation of scientific data *transitioning through time*).

f. X-planes are equal to years and A-planes are equal to longitude (three-dimensional representation of scientific data *transitioning across geography*).

g. A-planes are inverse to temperature (three-dimensional representation of explosion data *emphasizing its approach to combustion*).

Fig. 33E

| Object | Process | Statistic and Summary information values |
|---|---|---|
| Statistic and Summary information values can be used to adjust the visual attributes like size, color, transparency, blink, shake, texture, etc. of the following elements: | Statistic and Summary information values are generated the same way for each of the below processes that the query results undergo, whether it be for each imposed or expressed query-string or else for the combined results. | Statistic and Summary information values below represent a partial list of all the information found during processing and are presented to the user to help them understand, analyze and co-relate the information generated: |
| 1) Intersection<br>Each intersection generates a specific query-string combination with its resulting statistic and summary information – which can be shown in a dialog or used to set the intersection's shape attributes. | 1) Acknowledged<br>Each of the original acknowledged reply values (i.e. repeated reply values are grouped and counted as one) on a graph with both the distance to the axis and the distance to the axis perpendicular according to their value. | 1) Smallest<br>The smallest value in the datum.<br>2) Largest<br>The largest value in the datum.<br>3) Range<br>The difference between the largest and smallest values in the datum.<br>4) Sum<br>The sum of all the datum. |
| 2) Lattice<br>Each intersection connects with other intersections along horizontal, vertical and diagonal lattices. The resulting statistic and summary information along these lattices are averaged and can be shown in a dialog or used to set attributes for the displaying lattices shown in the cube. | 2) Spaced<br>Acknowledged values are 'flattened' along the axis perpendicular to the vector for the axis chart (i.e. the distance to the axis is zero). | 5) Groups<br>The amount of unique values found in the datum.<br>6) Average<br>The size of average value for the datum.<br>7) Mean<br>The arithmetic mean value for the datum.<br>8) Median<br>The median value for the datum. |
| 3) Plane<br>Each query or string used in the x, y, z, and a-plane of the cube has all its intersection's statistic and summary information averaged and they can be used for ordering and grouping within the cube, shown in a dialog or used to set attributes for displaying the plane. | 3) Counted<br>A bar at each axis at the coordinate of the acknowledged value is extended in the direction perpendicular to the axis at a distance of the total of replies given for its value. | 9) Variance<br>The amount the datum values are spread out from their average value.<br>10) Standard deviation<br>The amount the datum values differ from the mean value. |
| 4) Cube<br>Average values for all the intersections in the cube are used to compare cubes against each other. | 4) Stringed<br>The counted totals are rendered as points plotted in a direction perpendicular to the axis as a distance determined by the string used and with their size reflective of their counted totals. | 11) Fulcrum<br>Percentage, arc and degree value representing how much of the datum are greater than the fulcrum (midpoint value of the datum's scale).<br>12) Winner<br>Text label matching if the fulcrum is less than, equal to, or greater than the midpoint of the processed reply values. |
| 5) Animation<br>Each the animation as a whole or selected frames within can be used to find average values for all the cubes shown in it. | 5) Combined<br>The result of all the query-strings used with each query string result point determining the size of the bar on the query-string vector, so that bar volume represents the product of all the query-string stringed points at the acknowledged value. | 13) Majority<br>The larger of either the fulcrum or its compliment. |

METHOD, APPARATUS, AND COMPUTER READABLE MEDIUM FOR MODELING RELATIONSHIPS BETWEEN QUERY RESPONSES IN A DATA SET

RELATED APPLICATION DATA

This application is a continuation of U.S. application Ser. No. 15/707,356, filed on Sep. 18, 2017, the contents of which are hereby incorporated by reference in their entirety.

BACKGROUND

Data collection, focus groups, surveying, polling, voting, performance analysis, scientific analysis and data analysis involve the collection of response data to determine correlations and develop insights into a data set across many variables. FIG. 1 illustrates a flowchart for a method of modeling relationships between query responses in a data set according to an exemplary embodiment.

The principles and structure underlying such systems are typically based on equality of inputs—either 1-person-1-vote (example: 20% of the voters agree strongly or show positivity, 10% disagree somewhat or show slight negativity, and 70% disagree strongly or show extreme negativity) or each query reply presented is of equal importance to each other (example respiration above normal, rapid heartbeat, low blood pressure).

Even with rapid acceleration in computer processing speed and scope, current platforms provide analysis based on finding direct relationships between equally important findings (as opposed to correlating unequally important factors).

The human cognitive process of reaching decisions is almost never based on equality and so the results of polling or retrieving data in the usual ways have been far from useful and instead often misleading and mistrusted. A person's use of inequality-based decision making is inherently complex and opaque. If done by a leader of a group of people, relying on equality also leaves the participants out of the process and unaware of the real factors that led to the leader's decision (for example a teacher decides to follow the advice of the better students in some situations in order to pursue certain goals—however there is no real-time visualization or feedback system in this process or way for the students to understand what happened and why).

In the case of data sets which incorporate varying degrees of enthusiasm or support, responses themselves are often given emphasis by the responder (for example: more satisfied vs. somewhat satisfied or strongly disagree vs. disagree). These levels of support are usually not seamlessly integrated and harmonized with the results in a transparent manner. To the contrary, the data sets corresponding to those who respond with the most passion or level of support typically overshadow data sets with lower levels of support, usually due the implementation architecture of a particular value scale or the calculation of analytic metrics.

Social engineering and thought experiments are not quantized on either an imposed inequality base (for example, giving responses of students with mediocre grades more weight) or expressed inequality base (for example, giving moderate responses more weight than passionate responses) and most resulting data analysis is inaccurate and/or too rigid.

When provided, data analysis reports about hypothetical situations resulting from multiple combined query response sets along with various imposed and expressed adjustments result in up to thousands large tables and graphics. As a result, it is very difficult to understand, explore, or navigate the analysis data in order to form new insights.

There are no currently no data structures which encode and encapsulate analysis conducted on response data according to various inequality adjustments. Additionally, there are currently no graphical structures or interfaces which transform analytical data based on response data according to various inequality adjustments into a user-accessible and navigable format.

BRIEF DESCRIPTION OF THE DRAWINGS

FIGS. 2A-2B illustrate tables including example sectors, persons, and types of data that can be queried according to an exemplary embodiment.

FIGS. 3A-3B illustrate an interface through which a selection of queries and strings can be received and possible combinations of intersections according to an exemplary embodiment.

FIGS. 4A-4C illustrate tables showing query tags, string tags, and wizards used with the data modeling system according to an exemplary embodiment.

FIGS. 6A-6B illustrate expressed strings and imposed strings according to an exemplary embodiment.

FIGS. 11A-11B illustrate various sources of information and the various types of responses that can be extracted from them according to an exemplary embodiment.

FIG. 12 illustrates a flowchart for weighting a set of first responses from a plurality of sources to the first query based on magnitude values of one or more points in the plurality of points of the first string according to an exemplary embodiment.

FIG. 17 illustrates the process of weighting each set of second responses from the plurality of sources to the second query based on magnitude values of one or more points in the second plurality of points of the second string according to an exemplary embodiment.

FIGS. 20A-20D illustrate a tool interface which allows users to configure how values in any response are assigned to locations on an axis according to an exemplary embodiment.

FIG. 21 illustrates a flowchart for determining the representative value for each intersection based at least in part on the weighted set of first responses and the weighted at least one set of second responses according to an exemplary embodiment.

FIG. 30 illustrates charts and statistics that can be displayed for an intersection when a user selects an indicator corresponding to that intersection according to an exemplary embodiment.

FIGS. 31A-31E illustrate an example of the various charts, interfaces, and statistics that can be displayed for an intersection in response to selection of an indicator when each intersection corresponds to a comparison of two different combinations of queries and/or strings according to an exemplary embodiment.

FIGS. 33A-33E illustrates an interface for entering animation settings according to an exemplary embodiment and examples of the animation plane and animation frame placement.

FIG. 34 illustrates a table showing various objects, processes, and statistics that can be used in the system according to an exemplary embodiment.

DETAILED DESCRIPTION

While methods, apparatuses, and computer-readable media are described herein by way of examples and embodiments, those skilled in the art recognize that methods, apparatuses, and computer-readable media for modeling relationships between query responses in a data set are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Applicant has discovered a method and system for generating, extrapolating, and modeling relationships between different sets of query responses in a dataset which allows users to easily identify and navigate intersections of response data sets. The present system and method includes data structures which encode selected biases, such as inequality biases, into sets of responses, and includes data structures which allow users to visualize the effects of such biases upon the intersection of response data.

Figure 1:
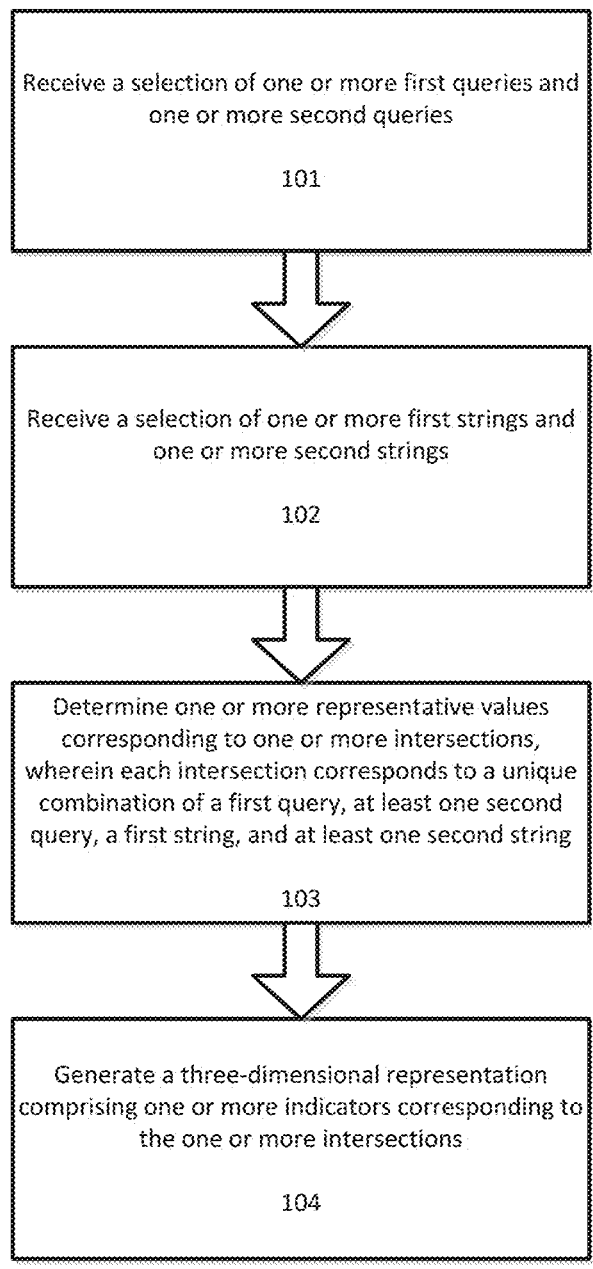
FIG. 1 illustrates a flowchart for a method of modeling relationships between query responses in a data set according to an exemplary embodiment.

FIG. 1 illustrates a flowchart for a method of modeling relationships between query responses in a data set according to an exemplary embodiment. At step 101 a selection of one or more first queries and one or more second queries is received. The queries can be any type of request for information. As will be discussed further below, the first queries and second queries are not necessarily different types of queries, but are processed slightly differently by the modeling system.

The present system can run multiple queries simultaneously/in parallel on a dataset and then convey the results in a relevant and elegant way. Queries are can include any kind of text string that, when applied to the dataset, returns a response—the response can be interpreted directly (measurement) or computed indirectly from corresponding index in a lookup table (multiple choice, dropdown list, ranking, rating, etc). As discussed below, queries can be run in a variety of formats from a variety of sources.

First queries are sometimes referred to herein as "expressed queries" and second queries are sometimes referred to herein as "imposed queries." These terms are not meant to be limiting and it is understood that first queries and second queries can be any type of query, including the same type of query. Expressed/imposed and first/second queries are differentiated based upon their subsequent processing by the modeling system. Responses are sometimes referred to herein as replies and these terms are used interchangeably. Responses/replies can be any information returned in response to a query or other request.

Queries can be selected as either imposed or expressed. During later processing (described below), responses to both types of queries are adjusted based on a weighting which is itself based on a string, which is described in greater detail below and encodes biases into the model. However, during adjustment, the imposed query response data points are adjusted along a different axis than the expressed query response data points. For example, imposed query response data points can be adjusted in a vertical direction relative to a horizontal axis and expressed query response data points can be adjusted in a horizontal direction relative to a vertical direction. As will be discussed below, another difference between imposed and expressed queries is that a representative value for a particular intersection is selected from response values to the expressed query in that intersection (the first query in the intersection).

In the case of a survey, the queries can correspond to questions asked to participants or to queries for demographic, biographical, psychological, physical, judgmental, preferential, score, or other information about participants.

FIG. 2A illustrates a table 201 including example sectors and persons within those sectors who can be queried for information. Additionally, the queries can also correspond to queries on a set of data. For example, a query to retrieve a data set meeting certain criterion. The data set can be certain rows in a columnar database, portions of metadata, sections of information, retrieved from a live feed of data, stored on servers or other computing devices, or any other subset of some stored information. FIG. 2B illustrates a table 202 showing various sectors and types of data that can be the target of queries.

Figure 3A:
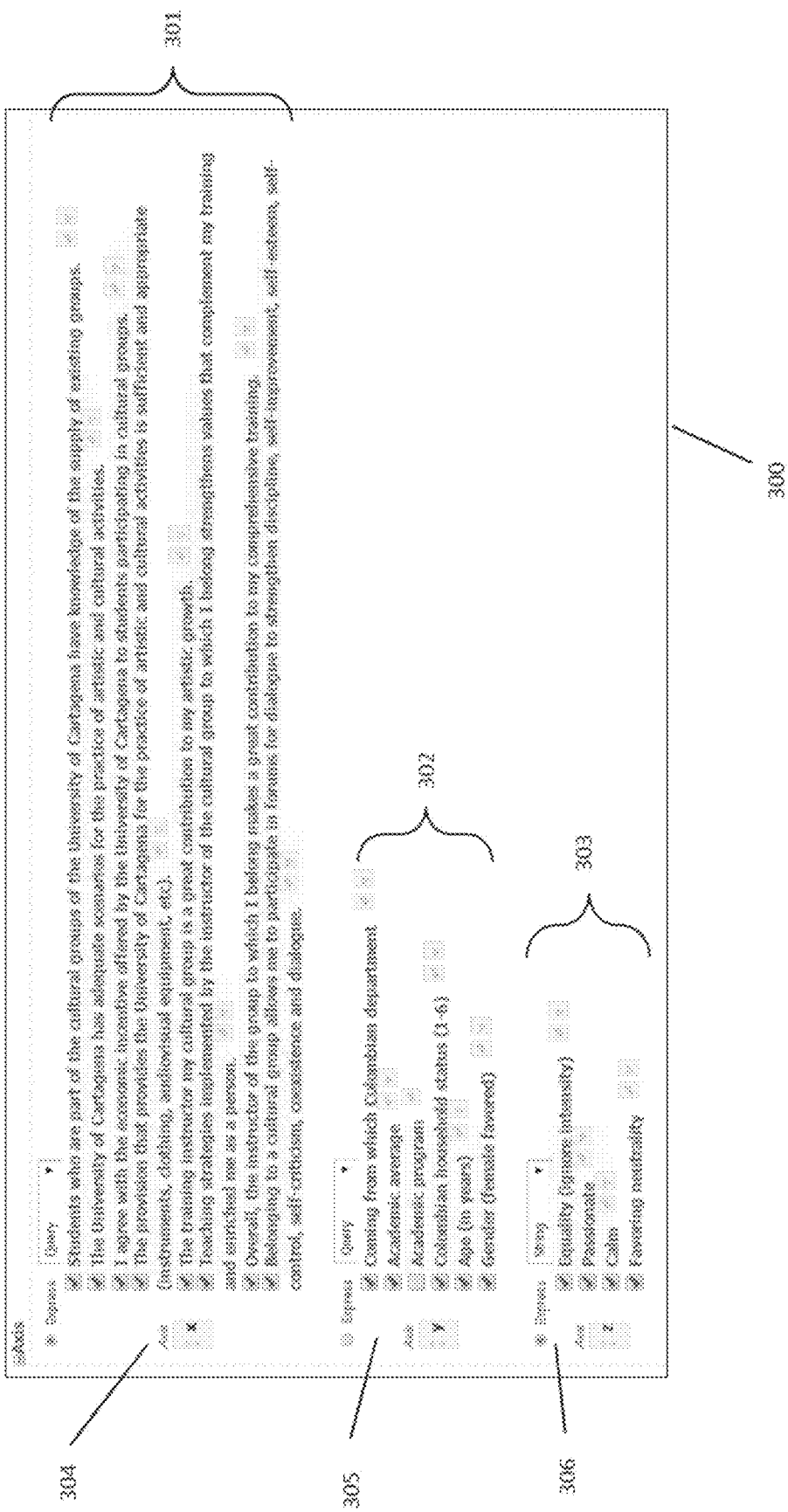

FIG. 3A illustrates an interface 300 through which a selection of queries and strings can be received according to an exemplary embodiment. Interface 300 illustrates the selected expressed queries 301 as well as the selected imposed queries 302 and expressed strings 303. In this example, each of the expressed queries comprises a statement to which a response is received from a survey participant in which they rate whether they agree or disagree with the statement. Interface 300 allows users to select an axis corresponding to each type of query and string, such as axis 304 for expressed queries, axis 305 for imposed queries and axis 306 for expressed strings. The selected axis for each type of query and string will be used to plot the queries and strings when generating a three-dimensional representation of intersections. The axis can be selected from one of the three-dimensional axes, including the x-axis, the y-axis, and the z-axis as well as a fourth axis known as the u-axis or the u-plane. The u-plane stands for the universal plane and can contain one or more records from its associated/mapped scope. The u-plane acts a little differently from the x, y and z planes because: (1) it allows for more than one layer of shapes, and (2) each layer allows for one or more strings, one or more comparisons between strings, one or more queries, and one or more comparisons between queries so long as the following rules are met when configuring the x, y, z and u planes: (a) contain one express query collection and one express string collection, and (b) have one or more pairs of imposed query collections and imposed string collections, numbered #1, #2, #3, etc.—where each pair is represented by a vector in the intersection bar charts (discussed further below): height, width, depth, height saturation, width saturation, depth saturation, etc., and (c) all the query-string pairs must either be made of single choices or else two choices to compare against each other (a layer cannot mix single with compare choices). If no computational value replies are returned by either the imposed query, the expressed query or queries, or their union, then nothing is calculated or rendered at the intersection.

FIG. 3B shows a few possible combinations of possible loading of queries and strings into the x, y, z and u axis according to those rules. For example, if the user in FIG. 3 were to set the axis for the imposed queries to the u-plane, the u-plane would contain at least the selected imposed queries. Each layer of the universal plane's scope is combined with the x, y and z plane's scopes at each intersection. The universal plane can include, for example, a single value, two custom paired values, or a pre-paired set of two or more values. If no computational value replies are returned by either the imposed query, the expressed query, or their union, then nothing is calculated or rendered at the intersection.

Each query can be stored as a separate record to permit tagging, analysis, commenting and ownership. FIG. 4A illustrates a table showing examples of users that can tag queries, examples of tags that can be used to characterize the query ("query tags"), an example of tags that can be used to identify which particular adjustment strings the query is relevant to ("adjustment tags"). Query tags can be matched to adjustment tags which are most relevant and an index of matching tags can be stored for easy access by users, who can use the index for guidance regarding which adjustment strings to model for particular queries. For example, tables 401A, 401B, and 401C in FIG. 4B shows examples of query tags and matching adjustment tags.

Users can multiple free tag any record in the system (query, string, analysis, comment, sector, electorate, etc.) in order to facilitate organizing, grouping, sorting and filtering of the records. Tags can be additionally stratified/categorized according to the status of the user who added them. Planes with a generated three-dimensional representation/model can also be highlighted and/or grouped by tags to facilitate correlations and predictions.

The system includes custom interfaces which are available to the user during record creation, query selection, string selection, and model parameter input in order to facilitate understanding of usage and results. Some of the wizards are survey, scientific, financial, educational, and/or political. FIG. 4C illustrates a table 402 showing some examples of wizards which can be utilized to set up the data modeling system.

Returning to FIG. 1, at step 102 a selection of one or more first strings and one or more second strings is received. As will be discussed in greater detail below, the strings are utilized by the system to encode amplifications to certain responses to the queries and de-amplifications to other responses to the queries, depending on the structure of the string.

Figure 5A:
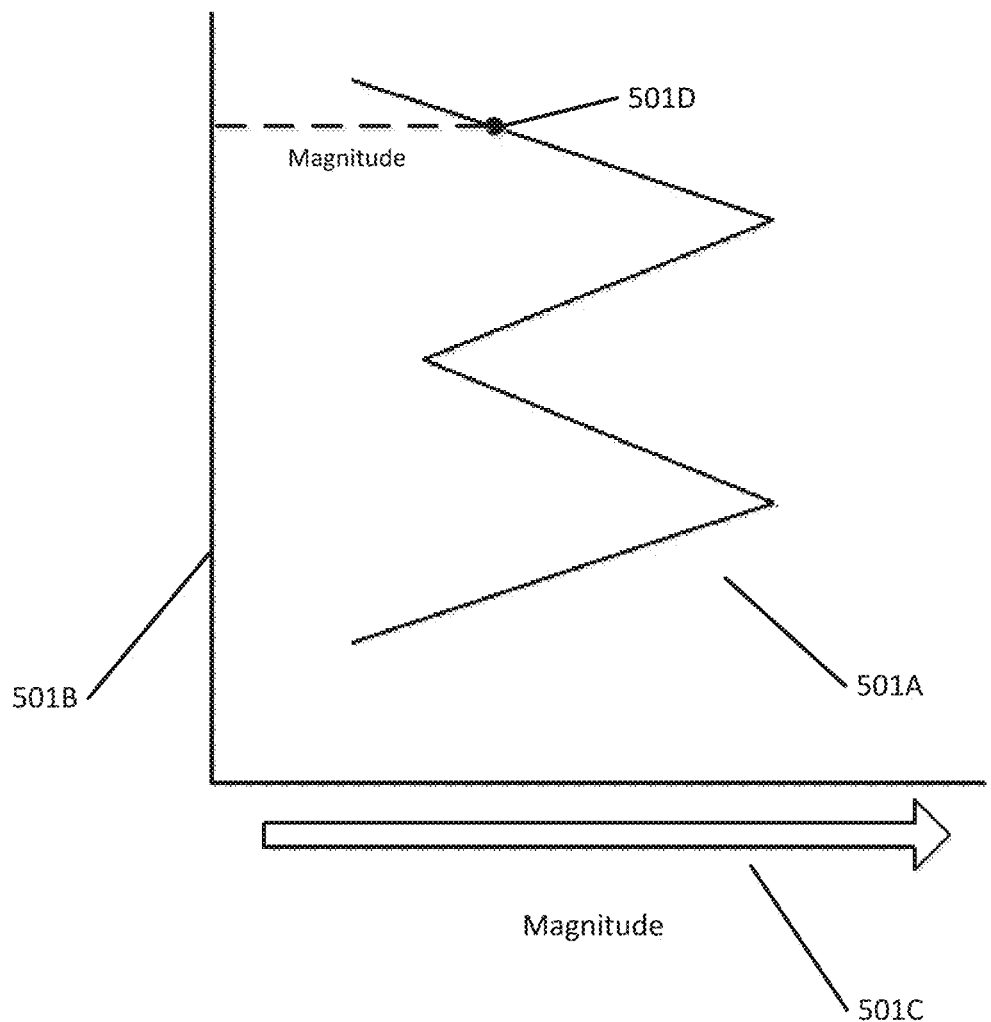
FIGS. 5A-5B illustrate a first string and second string according to an exemplary embodiment.

Each first string comprises a plurality of points spaced relative to a first axis, each point in the plurality of points having a magnitude corresponding to a shortest distance of that point from the first axis. FIG. 5A illustrates a first string according to an exemplary embodiment. The first string, referred to as "Moderation," includes plurality of points 501A spaced relative to axis 501B. The magnitude of each of the points is shown on axis 501C. For example, the magnitude of point 501D is based at least in part on the length of dashed line from point 501D to axis 501B. The dashed line hits axis 501B at a right angle and is therefore the shortest distance from point 501D to axis 501B. The magnitude of each of the points can also be expressed as the position of each point on axis 501C.

Figure 5B:
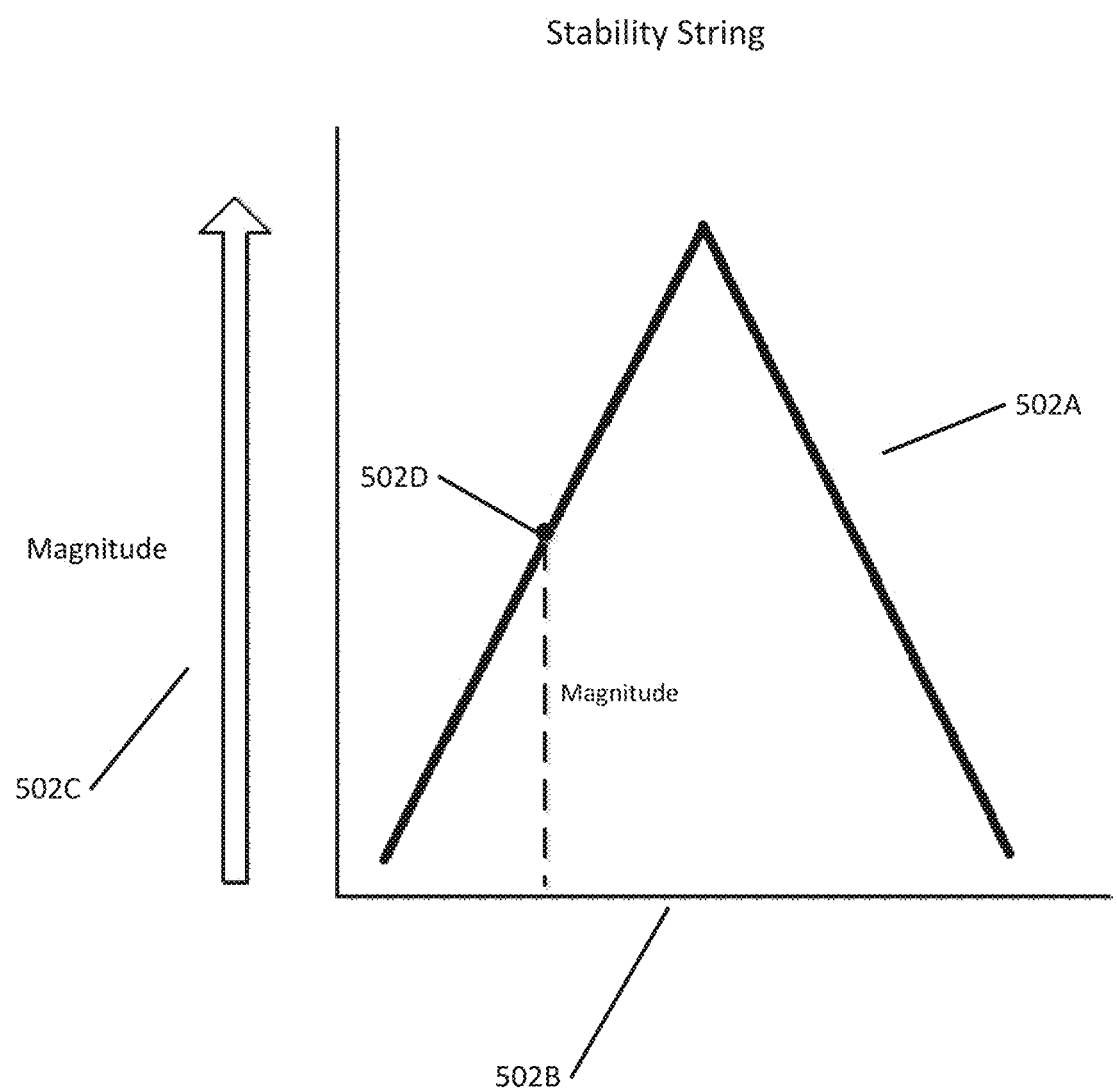

Each second string comprises a second plurality of points spaced relative to a second axis, each point in the second plurality of points having a magnitude corresponding to a shortest distance of that point from the second axis. FIG. 5B illustrates a second string according to an exemplary embodiment. The second string, referred to as "Stability," includes plurality of points 502A spaced relative to axis 502B. The magnitude of each of the points is shown on axis 502C. For example, the magnitude of point 502D is based at least in part on the length of dashed line from point 502D to axis 502B. The dashed line hits axis 502B at a right angle and is therefore the shortest distance from point 502D to axis 502B. The magnitude of each of the points can also be expressed as the position of each point on axis 502C.

An almost unlimited number of strings can be used as expressed (first) strings and imposed (second) strings, depending on the needs of the user and the particular analytical context. For example, table 601 of FIG. 6A illustrates some examples of expressed strings and table 602 of FIG. 6B illustrates some example of imposed strings. Of course, the expressed strings can be used as imposed strings by applying them against a different axis and vice versa.

Figure 7:
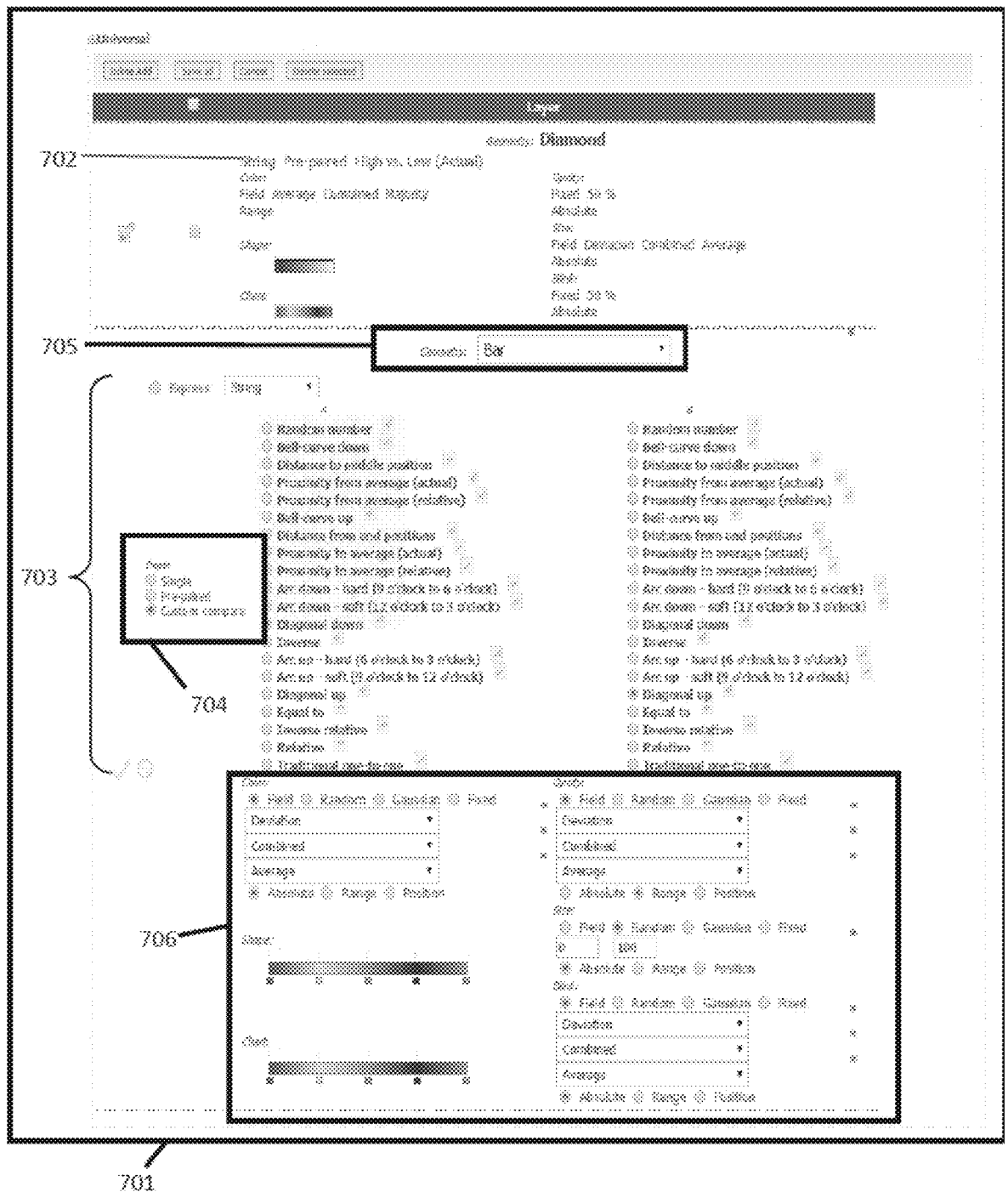
FIG. 7 illustrates an interface in which a user can select layers of shapes and set their queries and/or strings, and visual effects according to an exemplary embodiment.

FIG. 7 illustrates an interface 701 in which a user can define layers of the u-plane. Interface 701 allows users to select features of each layer that are used to display the information corresponding to that layer, such as layer 702 which is assigned to a diamond geometry and layer 703 which is assigned to a bar geometry. As shown in 701, the user has set two layers of shapes. The universal plane's layer's scope is combined with the x, y and z plane's scopes at each intersection. The universal plane can also be used to define a scope having more than one element. For example, control 704 allows a user to select a single value, two custom paired values, or a pre-paired set of two imposed strings. As shown in 705, different layers can be represented using different geometrical shapes, and as shown in 706, the visual attributes of the geometrical shapes can themselves be customized, such as by selecting color, size, opacity, and/or blink rate.

Figure 8A:
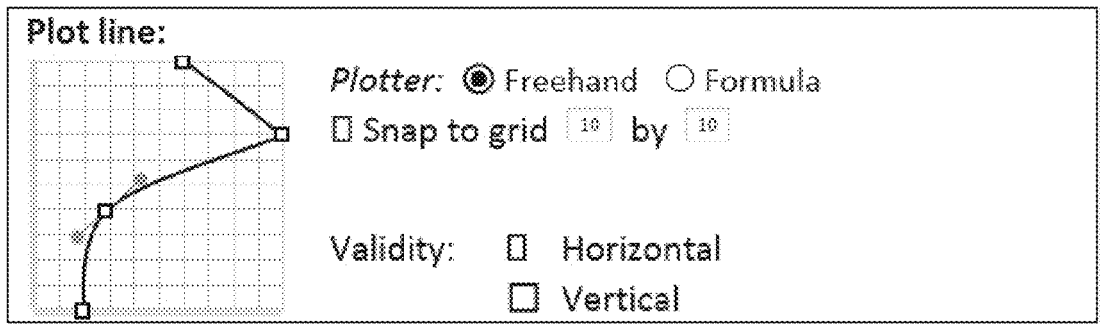
FIGS. 8A-8C illustrate input interfaces for strings according to an exemplary embodiment.
Figure 8B:
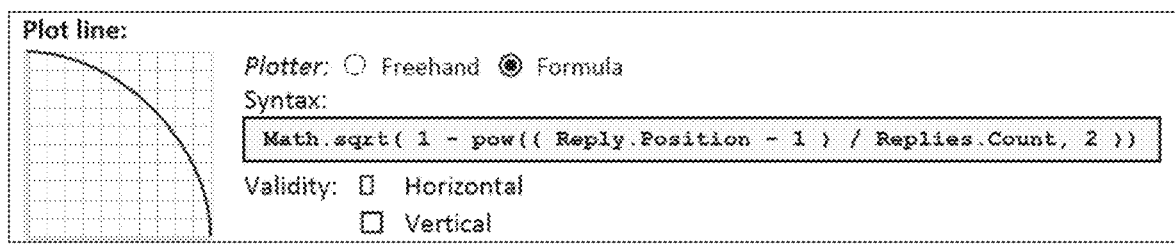
Figure 8C:
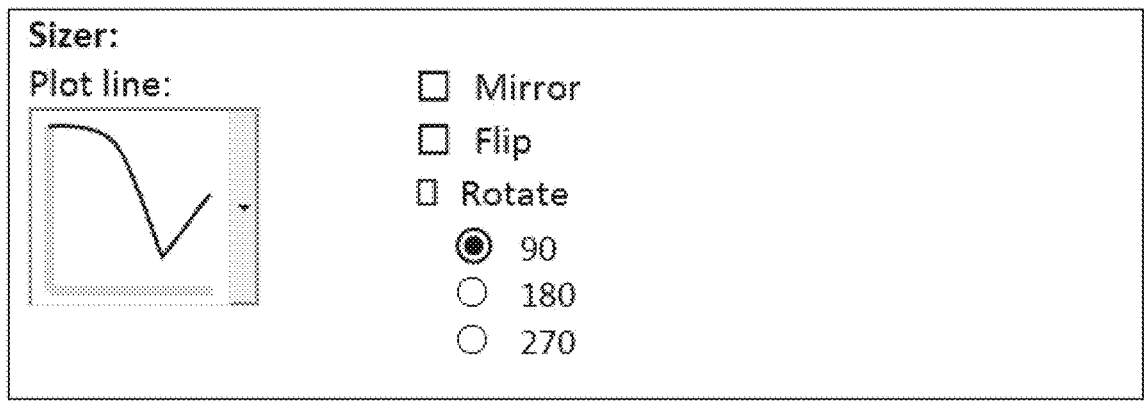

Strings (including expressed strings and imposed strings) can be defined or entered into the system using a variety of techniques. Users can create their own strings, import strings, or enter equations to generate strings. The created, imported, or generated strings can then be further modified or transformed and re-saved as new strings. FIG. 8A illustrates an interface 801 in which a user can draw a custom string using straight lines, free-form lines, and Bezier curves. FIG. 8B illustrates an interface 802 in which a user can enter a formula and generate a string based on the formula. FIG. 8C illustrates an interface 803 in which a use can perform modifications, translations, and transformations to strings.

Figure 9:
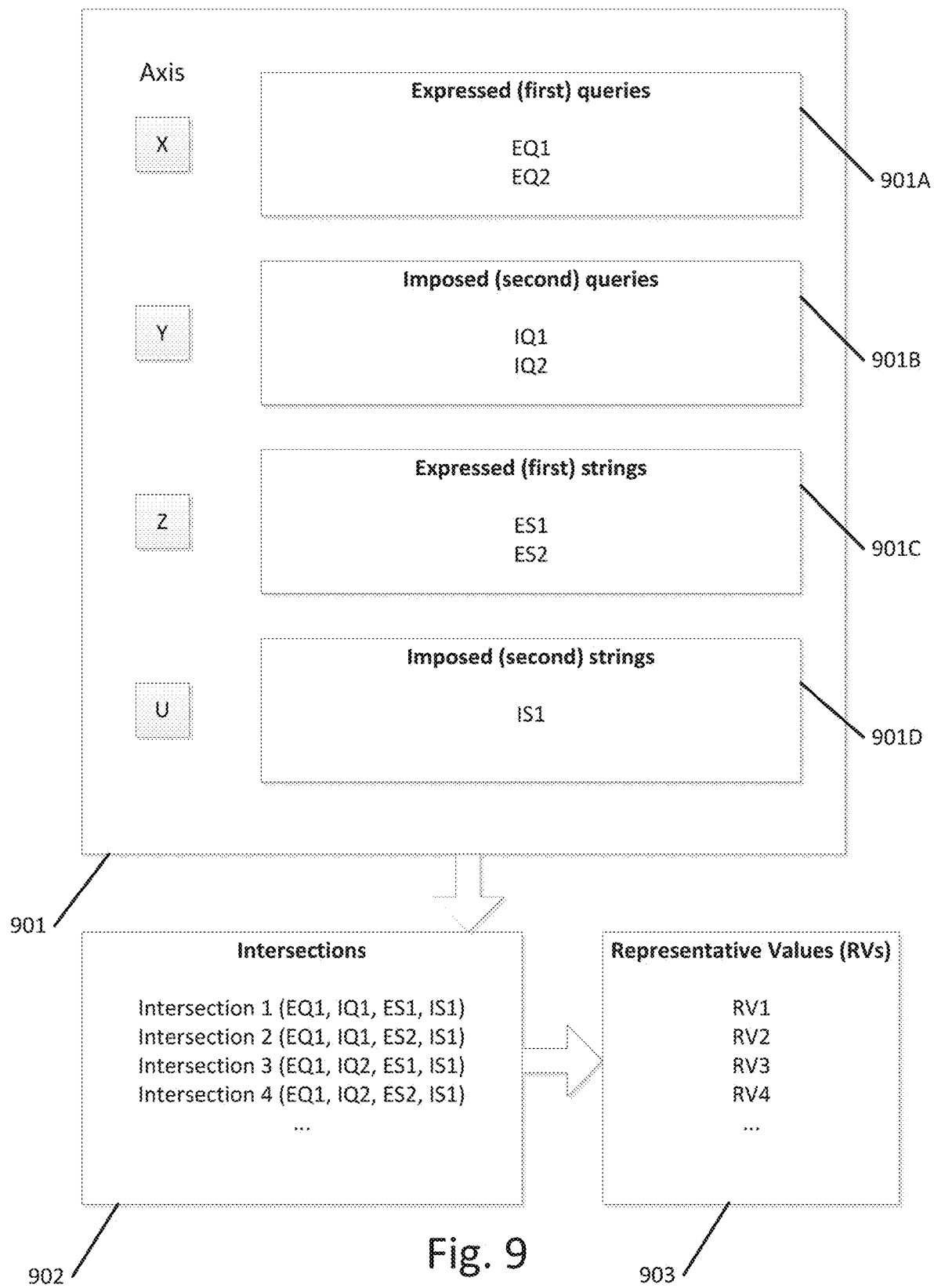
FIG. 9 illustrates a selection interface according to an exemplary embodiment.

Returning to FIG. 1, at step 103 one or more representative values corresponding to one or more intersections are determined. Each intersection corresponds to a unique combination of a first query, at least one second query, a first string, and at least one second string. Additionally, each representative value for each intersection is based at least in part on data corresponding to that intersection. FIG. 9 illustrates an interface in which a user has selected expressed queries 901A, imposed queries 901B, expressed strings 901C, and imposed strings 901D. As shown in box 902, this results in multiple intersections. For the purpose of this example each intersection corresponds to one first query, one second, query, one expressed string, and one imposed string. Box 902 illustrates the representative values that are generated for each intersection based at least in part on data corresponding to that intersection.

The representative value for each intersection can be a variety of different values. For example, the representative value can represent the output of some statistical process performed on the data corresponding to the intersection. As discussed further below, each representative value for each intersection can also comprise a value in a plurality of values received in response to the first query. For example, if the plurality of values received in response to the first query were {Strongly Disagree, Disagree, Neutral, Agree, Strongly Agree}, then the representative value for a particular intersection including the first query, a second query, a first string, and a second string would be one of the values {Strongly Disagree, Disagree, Neutral, Agree, Strongly Agree}. The process by which this representative value is determined is described in greater detail below.

Figure 10:
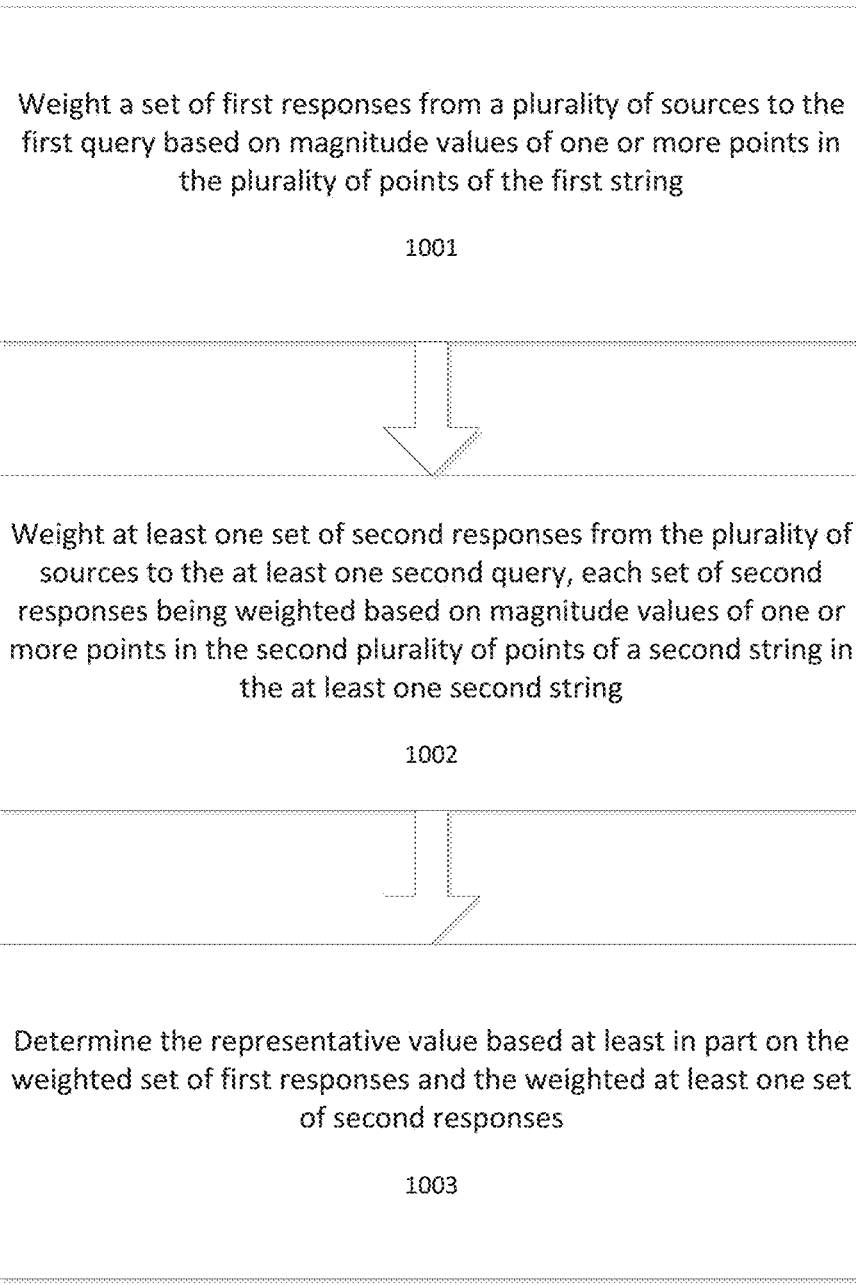
FIG. 10 illustrates a flowchart for determining a representative value according to an exemplary embodiment.

FIG. 10 illustrates a flowchart for determining a representative value according to an exemplary embodiment. At step 1001 a set of first responses from a plurality of sources to the first query is weighted based on magnitude values of one or more points in the plurality of points of the first string.

As used herein, a response can include any information or data which is responsive to a query. In the context of surveys, a response can be a user's answer to a question or a rating provided by a user indicating agreement/disagreement with a survey. In other contexts, a response can be information which is retrieved in response to a particular query, such as a database query or any other kind of information request. For example, health monitoring device information, shopping information, online browsing habits, sports data, financial indexes and/or scientific instrument information.

The plurality of sources can include any source which provides a response. In the context of surveys, a source can be a particular user who completes a survey, or a storage location, computing device, or server associated with a particular set of responses to the survey. A source can be an information source which is associated with a particular identifier, such as an IP address, a file folder, a file path, a document, etc. FIGS. 11A-11B illustrate various sources of information and the various types of responses that can be extracted from them.

FIG. 12 illustrates a flowchart for weighting a set of first responses from a plurality of sources to the first query based on magnitude values of one or more points in the plurality of points of the first string according to an exemplary embodiment.

Each first response in the set of first responses indicates a value in a plurality of values received in response to the first query. At step 1201 the plurality of values are assigned to a plurality of locations on the first axis, each location corresponding to a point in the plurality of points of the first string which is the closest point to that location.

Figure 13A:
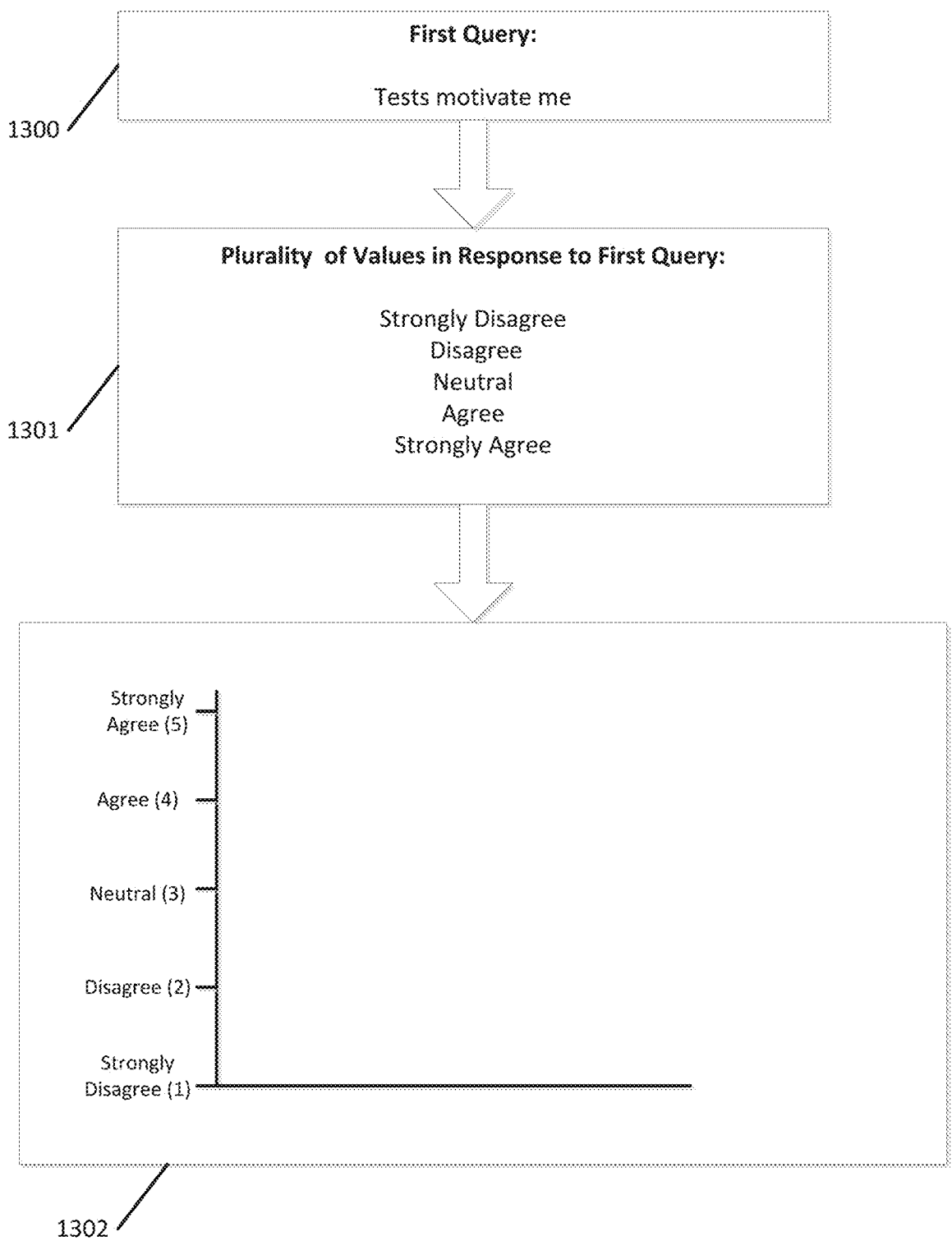
FIGS. 13A-13B illustrate an example of assigning the plurality of values to a plurality of locations on the first axis according to an exemplary embodiment.
Figure 13B:
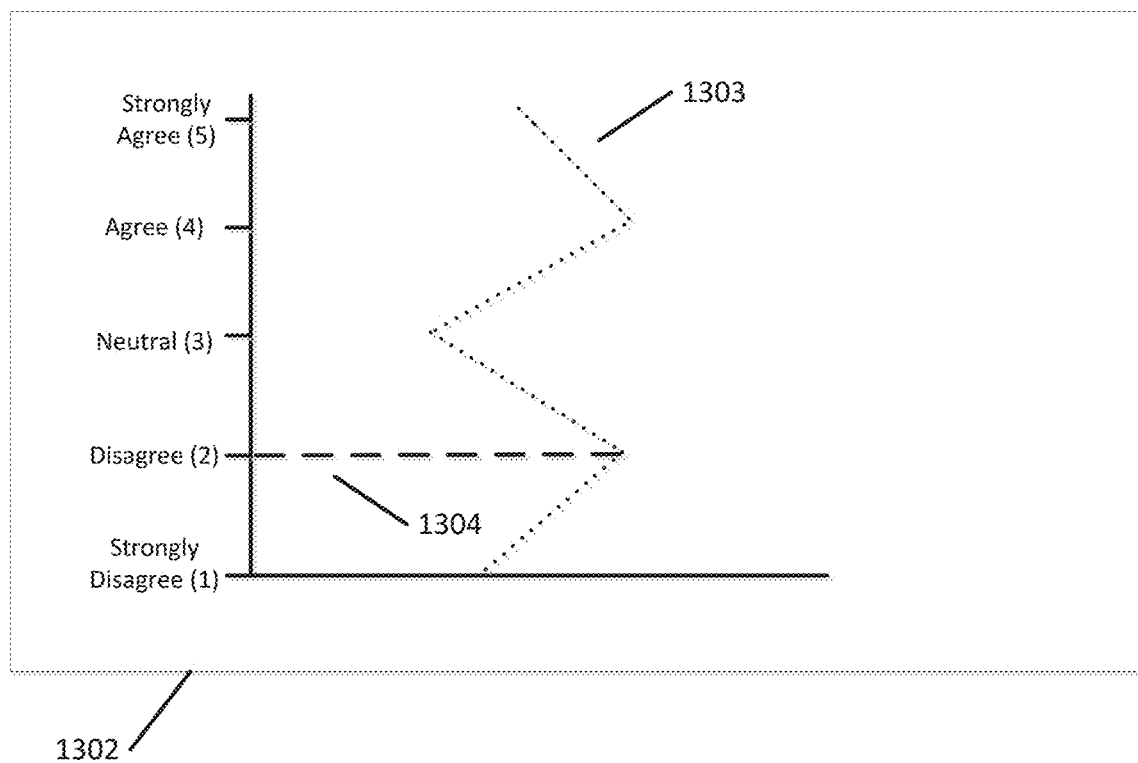

FIGS. 13A-13B illustrate an example of assigning the plurality of values to a plurality of locations on the first axis. FIG. 13A illustrates a first query 1300 as well as the plurality of values that are received in response to the first query. As shown in graph 1302, each of these values is assigned to locations on the y-axis. The assignment process can include determining a numerical equivalent for each value and using the numerical equivalent to determine the appropriate location on the axis. Alternatively, each value in the plurality of values can have an implicit or explicit numerical equivalent associated with it which is used to assign the value to a particular location on the axis. As shown in graph 1302 of FIG. 13A, each of the values in the plurality of values has been associated with a numerical equivalent between {1-5}. FIG. 13B illustrates the same graph 1302 as FIG. 13A with first string 1303 also plotted on the graph. As shown in graph 1302 of FIG. 13B, the location of each value on the y-axis corresponds to a point on the first string which is the closest point to that location. For example, dashed line 1304 illustrates the correspondence between the location corresponding to disagree (2) and a point on the first string which is the closest point to that location (dashed line 1304 meets the y-axis at a right angle).

Figure 14:
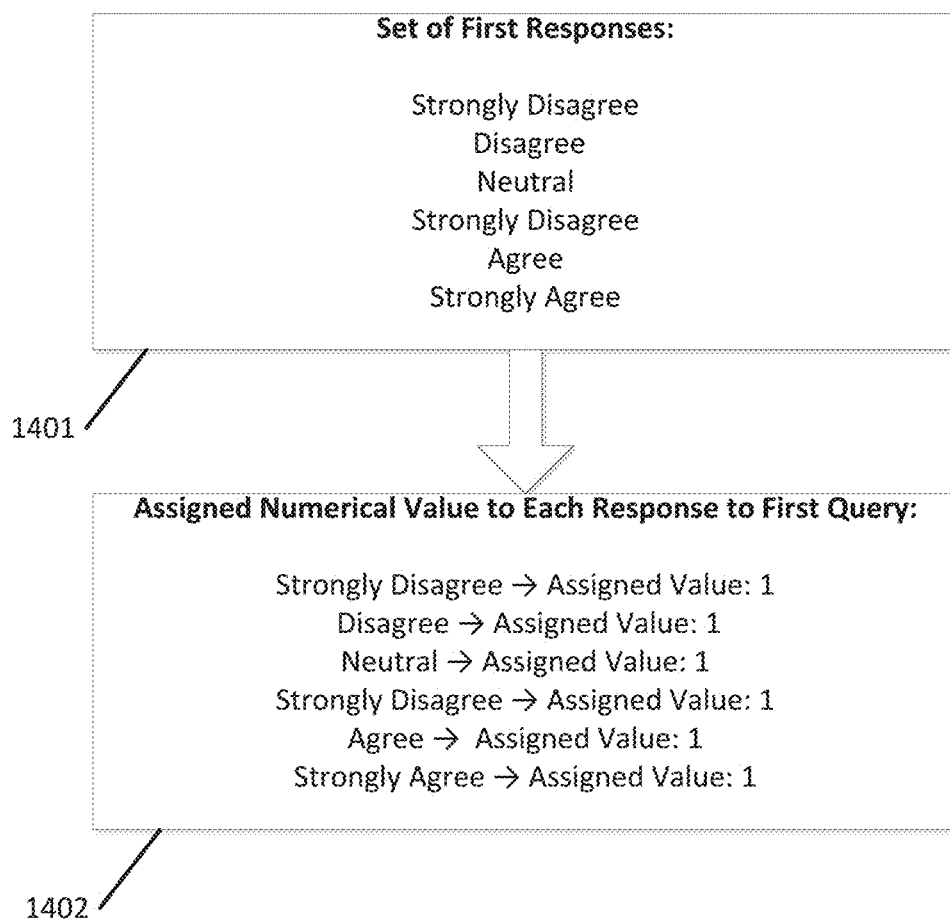
FIG. 14 illustrates the process of assigning a numerical value to each first response according to an exemplary embodiment.

At step 1202 of FIG. 12 a numerical value is assigned to each first response in the set of first responses. This numerical value can be thought of as an "initial weight" which is assigned to each response, prior to the response being weighted based on the first string. FIG. 14 illustrates the process of assigning a numerical value to each first response. As shown in FIG. 14, each of the responses in the set of first responses is assigned a numerical value of "1." This initial assignment can assign an equal value to each response when the user does not wish to skew or weight the responses other than as weighted by the first string. Alternatively, this initial weighting can be used to skew the significance of certain responses. For example, a first percentage of the set of first responses can be assigned a numerical value higher than a second percentage of the set of first responses in order to weight the first percentage of the set of first responses more highly.

Returning to FIG. 12, at step 1203 the numerical value assigned to each first response in the set of first responses is weighted by a magnitude of the point of the first string which corresponds to the location of the value indicated by that first response to generate a weighted set of first responses.

Figure 15:
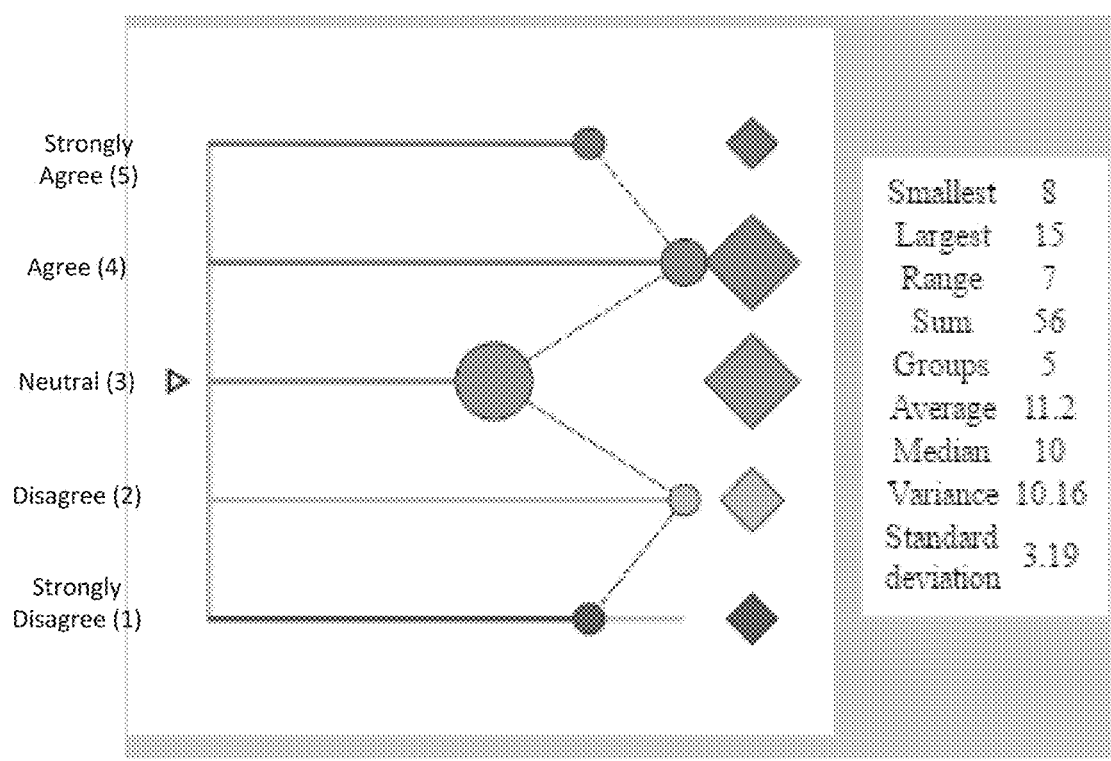
FIG. 15 illustrates weighting responses in the set of first responses according to an exemplary embodiment.

FIG. 15 illustrates an example of weighting responses in the set of first responses. As shown in FIG. 15, the first string is again a moderation string which weights moderate responses more heavily that passionate responses on the ends of the value scale and more heavily than neutral responses. For example, responses which indicate "agree" will have their numerical value weighted more heavily than responses which indicate "strongly agree." FIG. 15 also illustrates statistics corresponding to the weighted set of first responses after this weighting has been performed for the first responses. For example, the largest weighted sum for first responses is 15.

Figure 16:
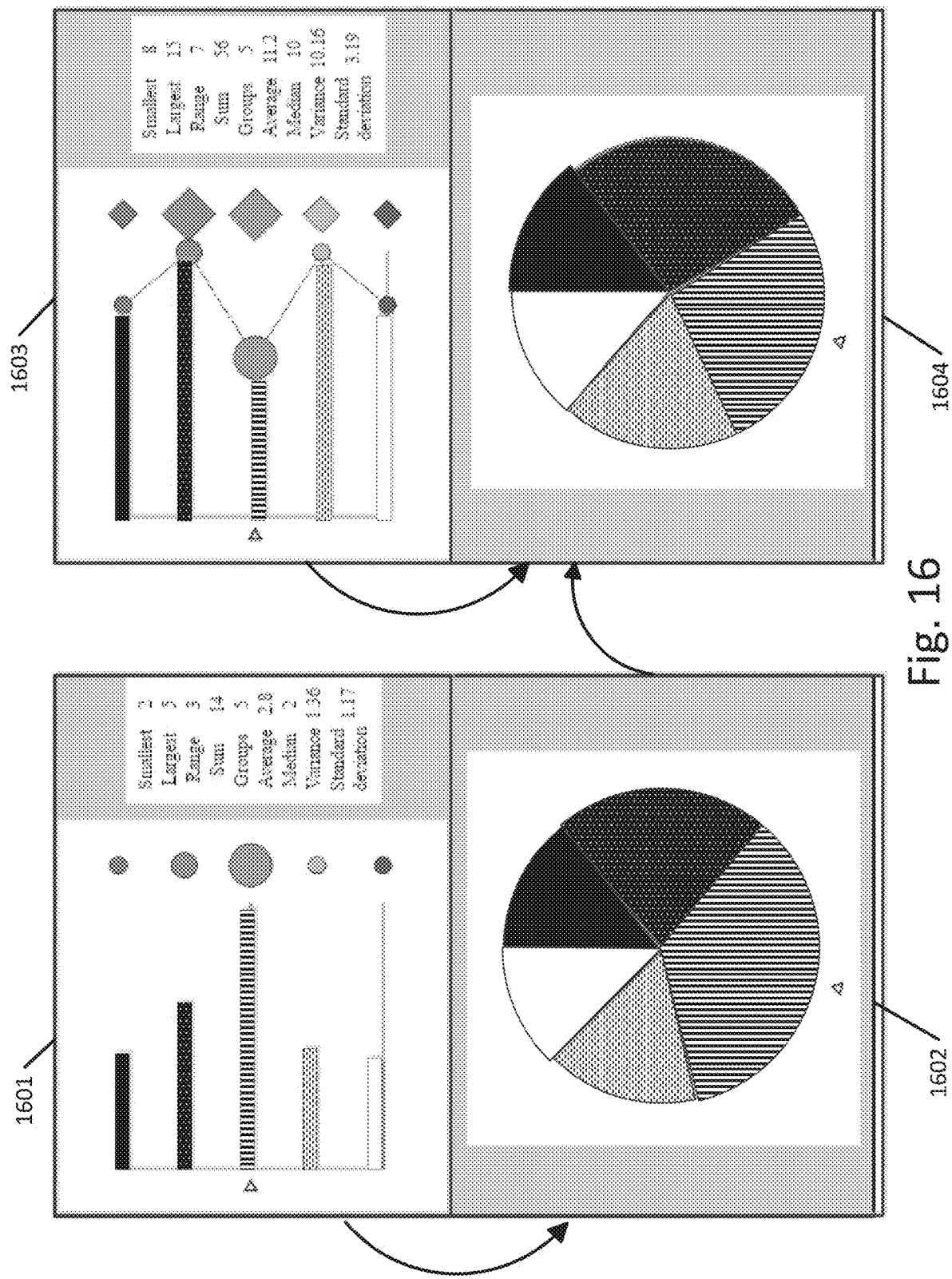
FIG. 16 illustrates the results of this weighting process for a set of first responses according to an exemplary embodiment.

FIG. 16 illustrates the results of this weighting process for a set of first responses. Box 1601 illustrates the total numerical values (in this case, the counts, since each response value has been assigned a numerical value of 1) of each of the value in the plurality of values in the set of first responses. For example, the "neutral" value has the highest total numerical values. Box 1602 shows a pie chart reflecting the total numerical values of each of the values in the plurality of values. Box 1603 illustrates the weighting applied to each of the numerical values assigned to each of the first responses. Additionally, box 1604 illustrates a pie chart reflecting to total weighted numerical values of each of the values in the plurality of values. As shown in box 1602, the neutral slice of the pie chart is much larger than other slices. However, since neutral values are weighted less than all other values (as shown in box 1603), the resulting neutral slice in box 1604 is smaller than before (un-weighted in 1602).

Returning to FIG. 10, at step 1002 at least one set of second responses from the plurality of sources to the at least one second query is weighted. Each set of second responses is weighted based on magnitude values of one or more points in the second plurality of points of a second string in the at least one second string.

FIG. 17 illustrates the process of weighting each set of second responses from the plurality of sources to the second query based on magnitude values of one or more points in the second plurality of points of the second string according to an exemplary embodiment.

Each second response in the set of second responses indicates a second value in a plurality of second values received in response to the second query. At step 1701 the plurality of second values are assigned to a plurality of locations on the second axis, each location corresponding to a point in the plurality of points of the second string which is the closest point to that location. At step 1702 a second numerical value is assigned to each second response in the set of second responses. At step 1703 the second numerical value assigned to each second response in the set of second responses is weighted by a magnitude of the point of the second string which corresponds to the location of the second value indicated by that second response to generate a weighted set of second responses.

The weighting process shown in FIG. 17 is similar to that shown in FIG. 12 and incorporates the steps outlined with respect to FIG. 12 above. The difference is that the steps of FIG. 17 are performed with regard to a second axis, using a set of second responses to a second query, and using a second string.

Figure 18:
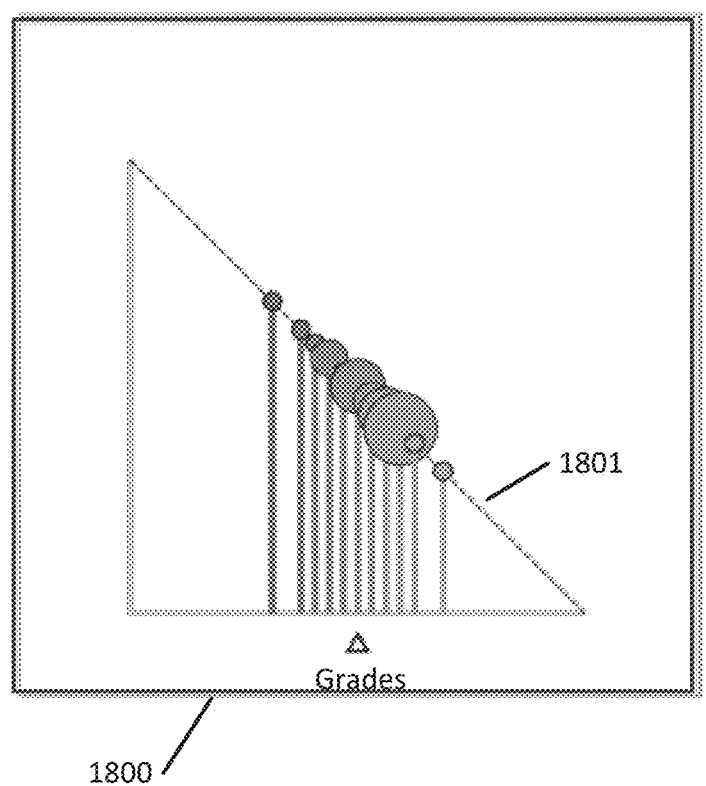
FIG. 18 illustrates a graph showing the weighting assigned to various grades based on a string according to an exemplary embodiment.

FIG. 18 illustrates a graph 1800 showing the weighting assigned to various grades based on string 1801, which is an inverse string that weights lower grades more highly than higher grades. In this case, the plurality of second values received in response to the second query comprise the plurality of grades in the grade distribution.

Figure 19:
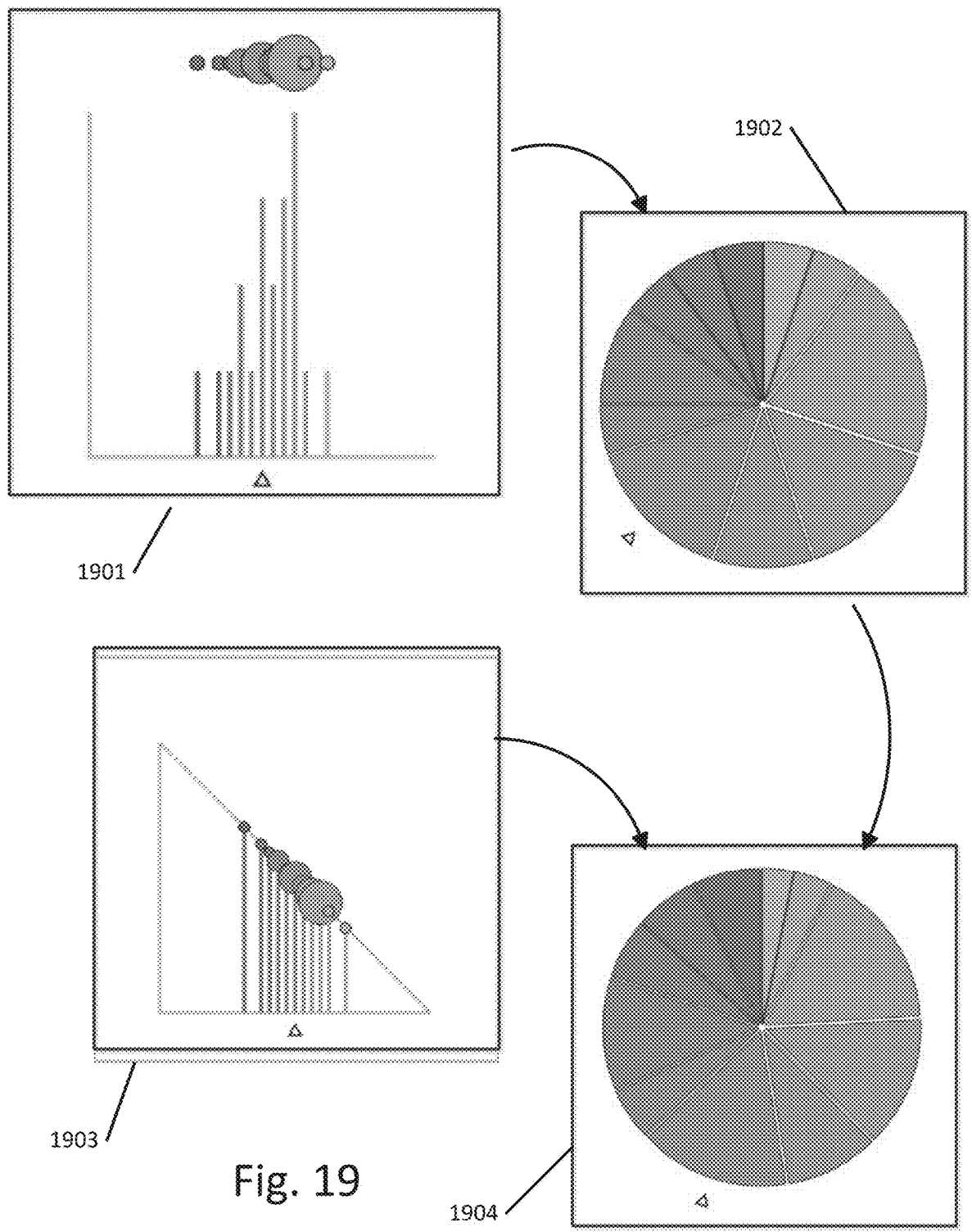
FIG. 19 illustrates the results of the weighting process for a set of second responses according to an exemplary embodiment.

FIG. 19 illustrates the results of the weighting process for a set of second responses. Box 1901 shows the total counts (assigned numerical values) of each of the grade (the plurality of second values). Box 1902 is a pie chart reflecting the counts for each grade. Box 1903 illustrates the weighting applied to the numerical value assigned to each grade and box 1904 illustrates a pie chart reflected the total weighting of the numerical values assigned each grade (the weighted count).

As discussed above, prior to weighting values in the plurality values in the first responses or weighting second values in the plurality of second values in the second responses, it is necessary to space the plurality of values/second values and assign them locations on the first axis/second axis. There are a variety of techniques for doing so.

FIGS. 20A-20D illustrate how a tool interface which allows users to select fields (Spacing: Absolute|Position and Trim: None|Both|Low|High) and a slider control (Offset) can assign values in any response are located on an axis. FIGS. 20A-20D refer to second values received in second responses but the techniques shown therein are equally applicable to first values received in first responses.

Figures 20A, 20B:
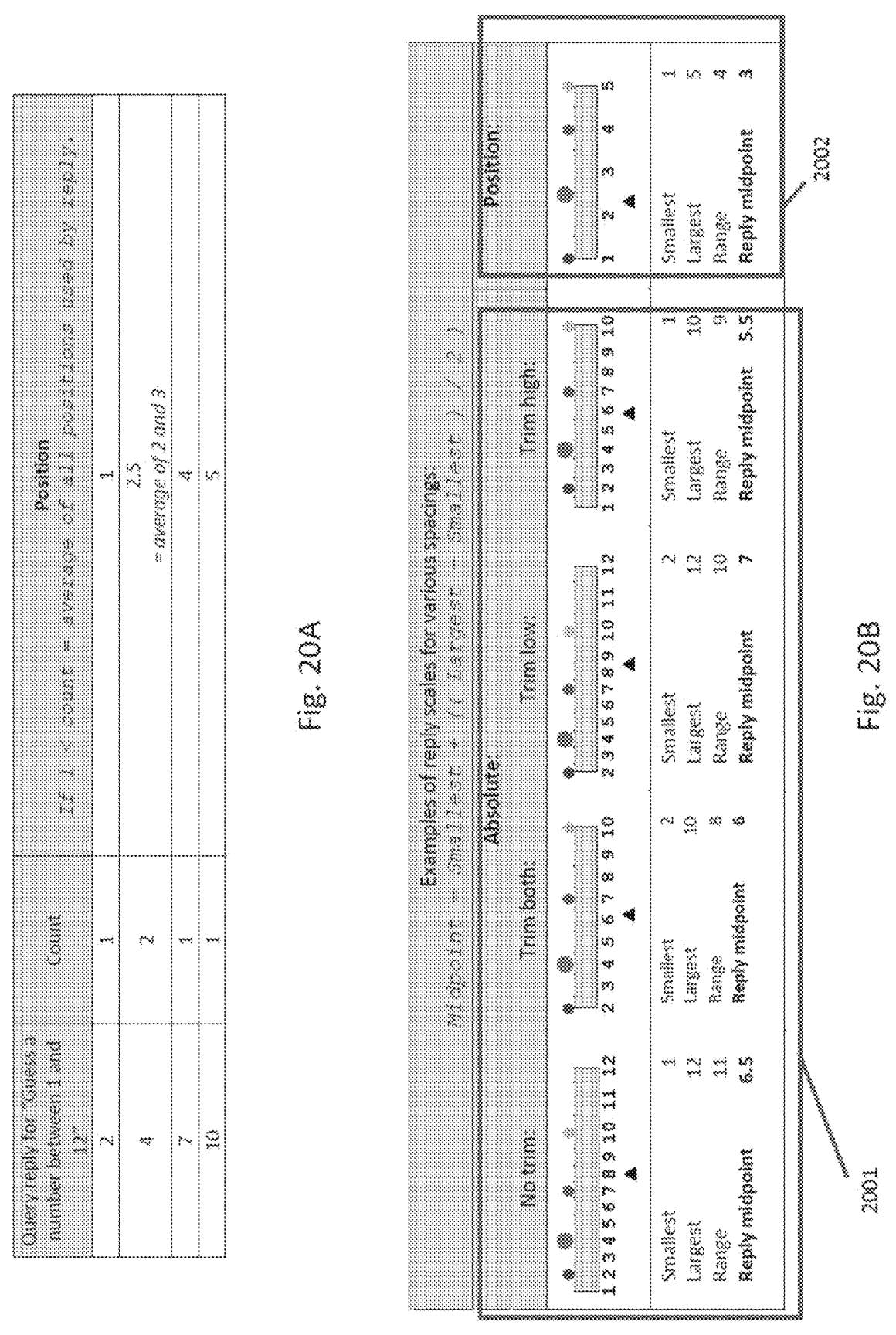
Figure 20C:
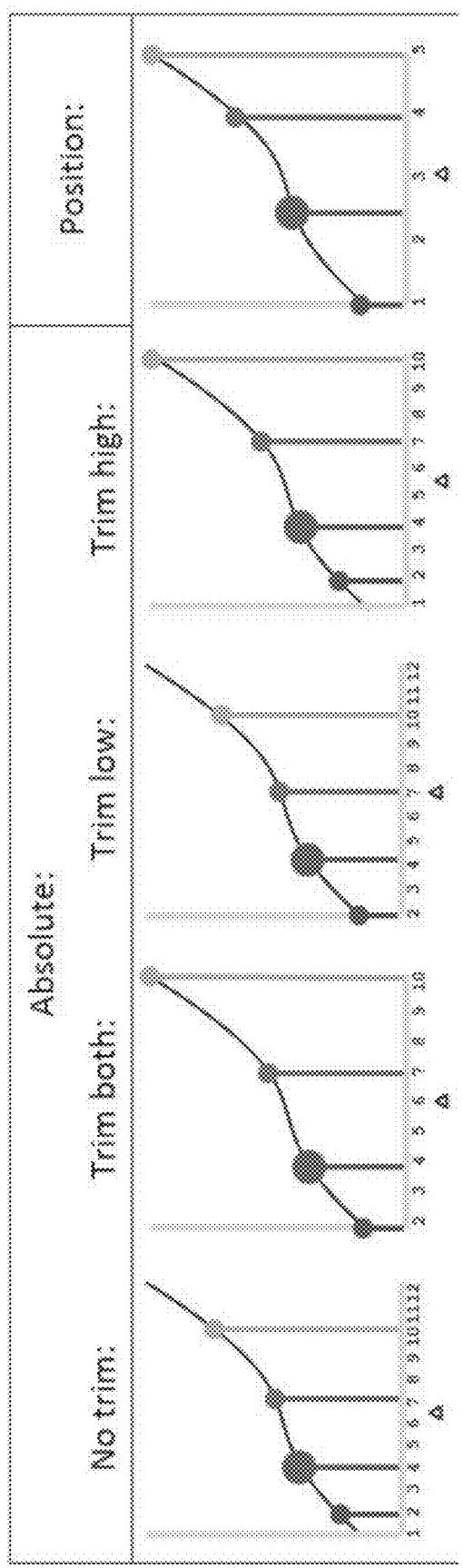
Figure 20D:
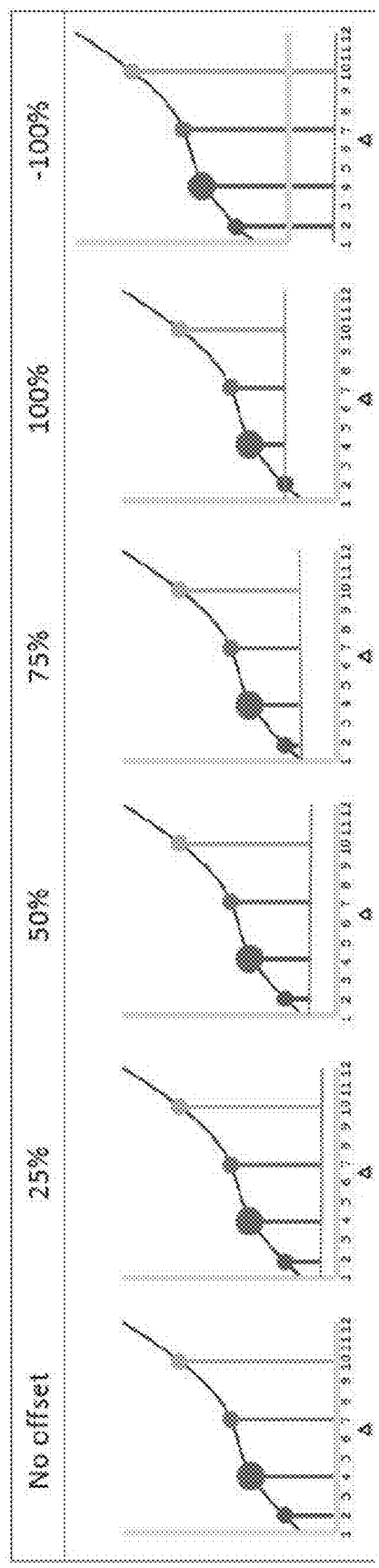

For the purposes of FIGS. 20A-20D, the possible values of a response to a query ("Guess a number between 1 and 12") can be values in the range from 1-12. However, the actual values of the responses received in FIGS. 20A-20D include only 2, 4, 7, and 10 (FIG. 20A). Therefore, the plurality of values are {2, 4, 7, and 10}, whereas the possible values are {1-12}. A user can decide how to assign this plurality of values to an axis by either trimming upper and/or lower ends of possible values which are not in the plurality of values, as shown in FIG. 2001. A user can also opt to use position spacing, where the plurality of values is positioned equally, as shown in FIG. 2002. Once the spacing has been decided a reply midpoint is calculated half way between the smallest and largest possible positions. When the results are (counted and) stringed, their location along the string is effected by their spacing, as shown in FIG. 20C. Additionally, a user can decide on whether to offset the plurality of values and how much to offset plurality of values, such as is shown in FIG. 20D. The low offset number is set using an expandable slider control and changes the size of all the values according to some percentage of the smallest measurement found.

Returning to FIG. 10, at step 1003, the representative value for each intersection is determined based at least in part on the weighted set of first responses and the weighted at least one set of second responses.

FIG. 21 illustrates a flowchart for determining the representative value for each intersection based at least in part on the weighted set of first responses and the weighted at least one set of second responses according to an exemplary embodiment.

At step 2101, for each source in the plurality of sources, the weighted first response of that source to the first query is re-weighted by the weighted second response of that source to the at least one second query. At step 2102 a plurality of total quantities corresponding to the plurality of values received in response to the first query is computed by summing all re-weighted first responses which correspond to the same value. At step 2103 a representative value is determined from the plurality of values based at least in part on the plurality of total quantities.

Figure 22:
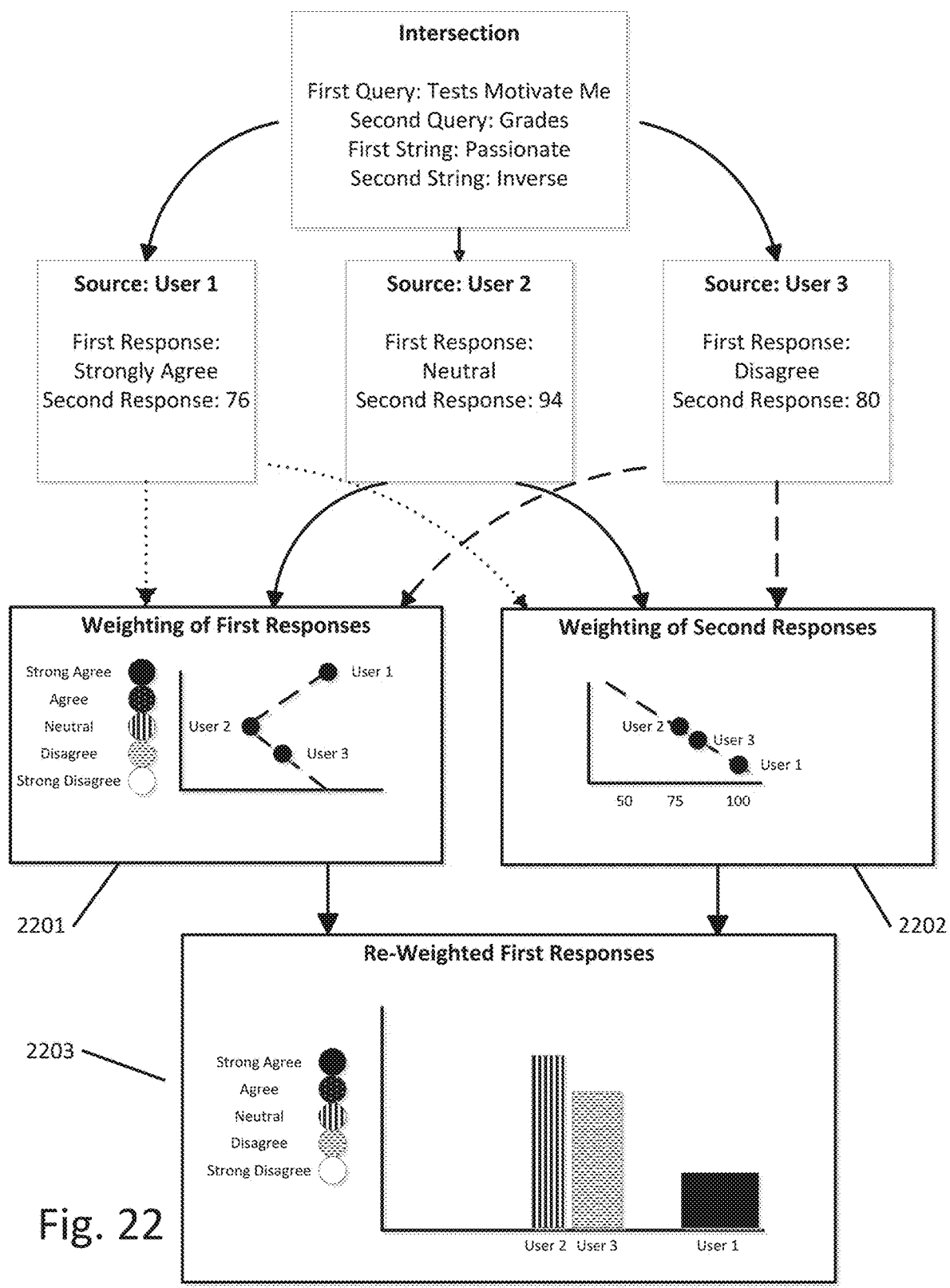
FIG. 22 illustrates determining the representative value for an intersection according to an exemplary embodiment.

FIG. 22 illustrates an example of determining the representative value for an intersection according to an exemplary embodiment. As shown in FIG. 22, the intersection includes a first query, a second query, a first string, and a second string. Responses to the first and second query are received from three sources, User 1, User 2, and User 3. The first responses are then weighted according to the first string as shown in box 2201 and the second responses are weighted according to the second string as shown in box 2202. The weighted first response for each source is then re-weighted by the weighted second response of that source to the second query, as shown in box 2203. For example, the first response of User 2 is weighted the lowest of any of the first responses (box 2201), resulting in a width of the re-weighted first response corresponding to User 2 being narrower than any of the other re-weighted first responses (box 2203). However, the second response of User 2 is weighted higher than any of the other second responses (box 2202). Since this weighted second response is used to re-weight the weighted first response and since this weighting is along a different axis, this results in the re-weighted first response of User 2 being taller (higher) than any of the other re-weighted first responses (box 2203). Therefore, the re-weighted first responses shown in box 2203 incorporate two different weightings along two different axes while preserving values given in response to the first query. In another example, the second response of User 1 is weighted less than any other second response (box 2202) but the first response of User 1 is weighted more than any other first response (box 2201). This results in the re-weighted first response of User 1 being wider than any other re-weighted first response but also shorter than any other re-weighted first response.

Figure 23:
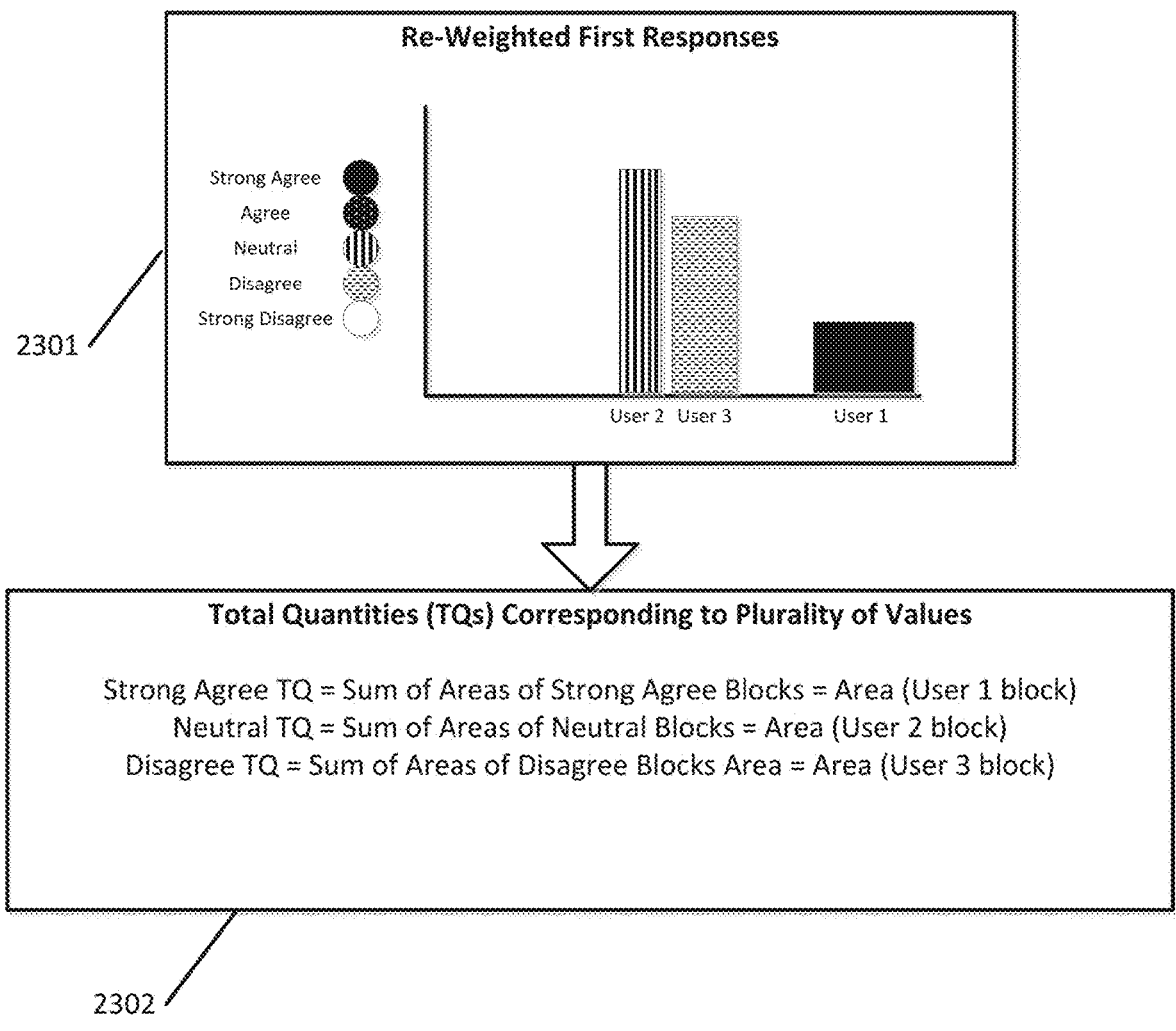
FIG. 23 illustrates computing a plurality of total quantities corresponding to a plurality of values received in response to a first query according to an exemplary embodiment.

FIG. 23 illustrates example of computing a plurality of total quantities corresponding to the plurality of values received in response to the first query shown in FIG. 22. Box 2301 of FIG. 23 is similar to box 2203 of FIG. 22 and includes the re-weighted first responses. As shown in box 2302 of FIG. 23, the plurality of values received in response to the first query are {Disagree, Neutral, Strong Agree}. The total quantity corresponding to each of these values is determined by summing the re-weighted first responses for each value. However, since there is only one re-weighted first response for each of these values, the total quantity of each of these values is given by the area of the corresponding re-weighted first response, as shown in box 2302. However, if there were multiple re-weighted first responses which had the same value, for example, two "strong agrees", then the total quantity corresponding to "strong agree" would be the sum of the areas of the two re-weighted first responses which indicated "strong agree."

Figure 24:
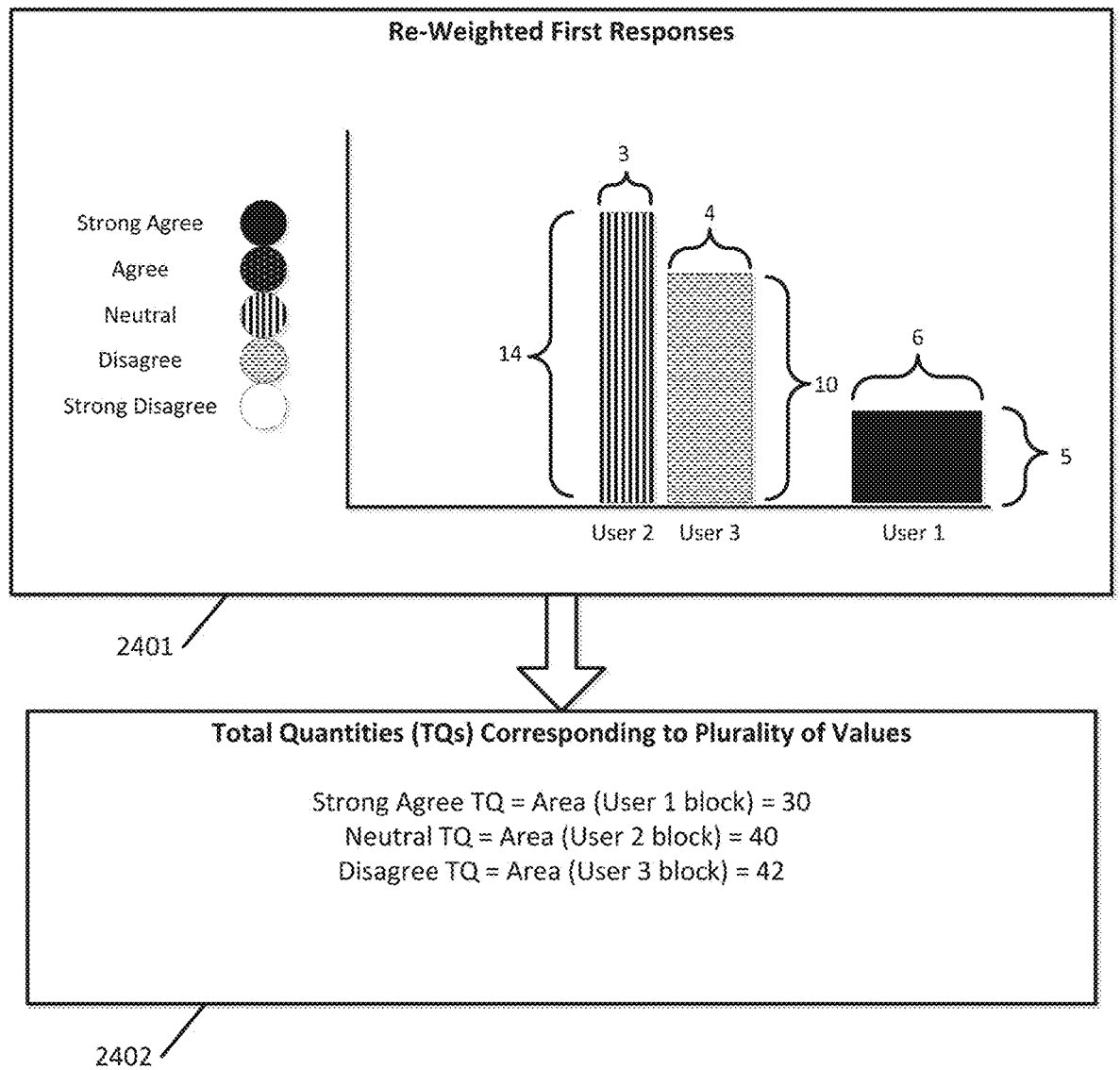
FIG. 24 illustrates calculations of total quantities of a plurality of values according to an exemplary embodiment.

FIG. 24 illustrates example calculations of total quantities of the plurality of values shown in FIG. 23. Box 2401 illustrates the height and width of each of the re-weighted first responses. Box 2402 illustrates the total quantities corresponding to each of the plurality of values based on areas of each of the relevant re-weighted first responses.

Once the total quantities of each of the values in the plurality of values have been determined, the total quantities can be used to determine a representative value for the intersection. This process can include (1) determining a sort order of the plurality of values based at least in part on the plurality of locations on the first axis assigned to the plurality of values, (2) determining a median value in the plurality of values based at least in part on the sort order of the plurality of values, (3) generating a chart comprising a plurality of sections corresponding to the plurality of values, wherein the plurality of sections are sorted ordered according to the determined sort order and wherein a size of each section in the plurality of sections is based at least in part on a corresponding total quantity of a values corresponding to that section, (4) determining a fulcrum of the plurality of sections, wherein the fulcrum comprises a midpoint of a section in the plurality of sections which corresponds to the median value, and (5) designating a value in the plurality of values as the representative value based at least in part on a location of the fulcrum relative to a midpoint of the plurality of sections. In the event that there are two possible median values, a final median value can be selected between them based on some criteria (e.g., select the higher or lower value), user settings, user input, or determined in some other way. Alternatively, if there is no median value, then the representative value can simply be set to the value with the highest total quantity.

Figure 25:
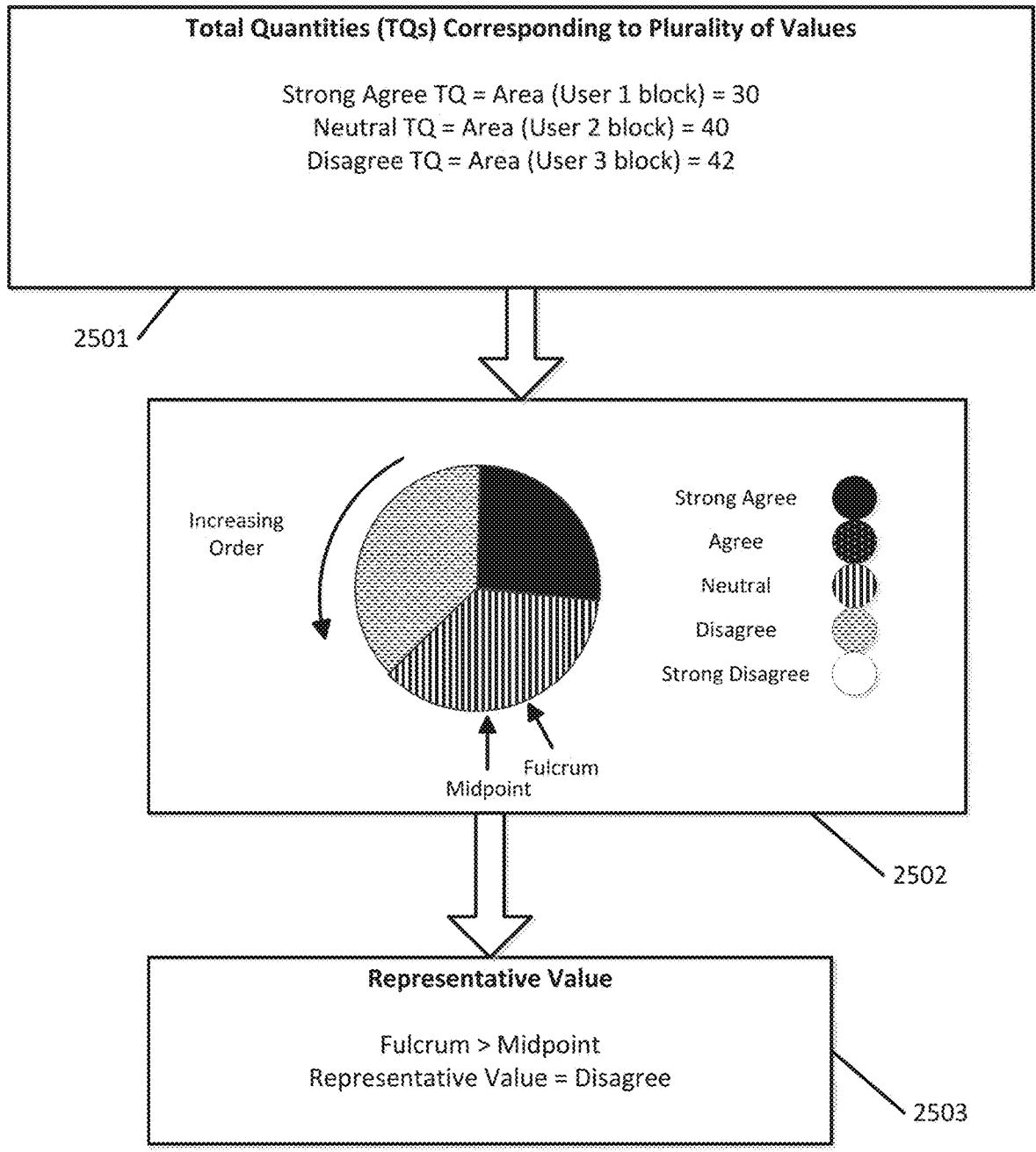
FIG. 25 illustrates determining a midpoint and fulcrum based on total quantities according to an exemplary embodiment.

FIG. 25 illustrates an example of determining a midpoint and fulcrum based on the total quantities of FIG. 24. Box 2501 corresponds to box 2402 of FIG. 24 and includes the same plurality of values and total quantities. The sort order of the plurality of values can be determined based on their locations on the first axis, for example as shown in FIGS. 15 and 22. This results in a sort order of {disagree, neutral, strong agree}. In this case, the median value is neutral. As shown in box 2502, a pie chart is generated with each slice corresponding to a value. The size of each slice is based on the total quantity of the corresponding value. For example, the "disagree" slice is the largest since value "disagree" has the highest total quantity. The slices are ordered in a counter-clockwise fashion in increasing order. Box 2501 additionally shows the fulcrum of the pie chart, which is the midpoint of a section in the plurality of sections which corresponds to the median value. In this case, the median value is "neutral" so the fulcrum is the midpoint of the neutral slice. Box 2501 also shows the midpoint of the pie chart, which is the midpoint of the plurality of sections, which is at the 6 o'clock position in the pie chart.

Once the fulcrum and the midpoint are known, a value in the plurality of values is designated as the representative value based at least in part on a location of the fulcrum relative to a midpoint of the plurality of sections. This can include the following steps: (1) determining a location of the fulcrum relative to the midpoint of the plurality of sections, (2) designating the median value in the determined sort order as the representative value based at least in part on a determination that the fulcrum is equal to the midpoint of the plurality of sections, (3) designating a value subsequent to the median value in the determined sort order as the representative value based at least in part on a determination that the fulcrum is less than the midpoint of the plurality of sections, and (4) designating a value prior to the median value in the determined sort order as the representative value based at least in part on a determination that the fulcrum is greater than the midpoint of the plurality of sections.

As shown in box 2503 of FIG. 25, the fulcrum is greater than the midpoint. This results in the representative value for the intersection shown in FIG. 22 being set to a value prior to the median value (the neutral value) in the determined sort order. Since the value prior to the neutral value in the determined sort order is "disagree," the representative value for the intersection is set to "disagree," as shown in box 2503 of FIG. 25.

Figure 26:
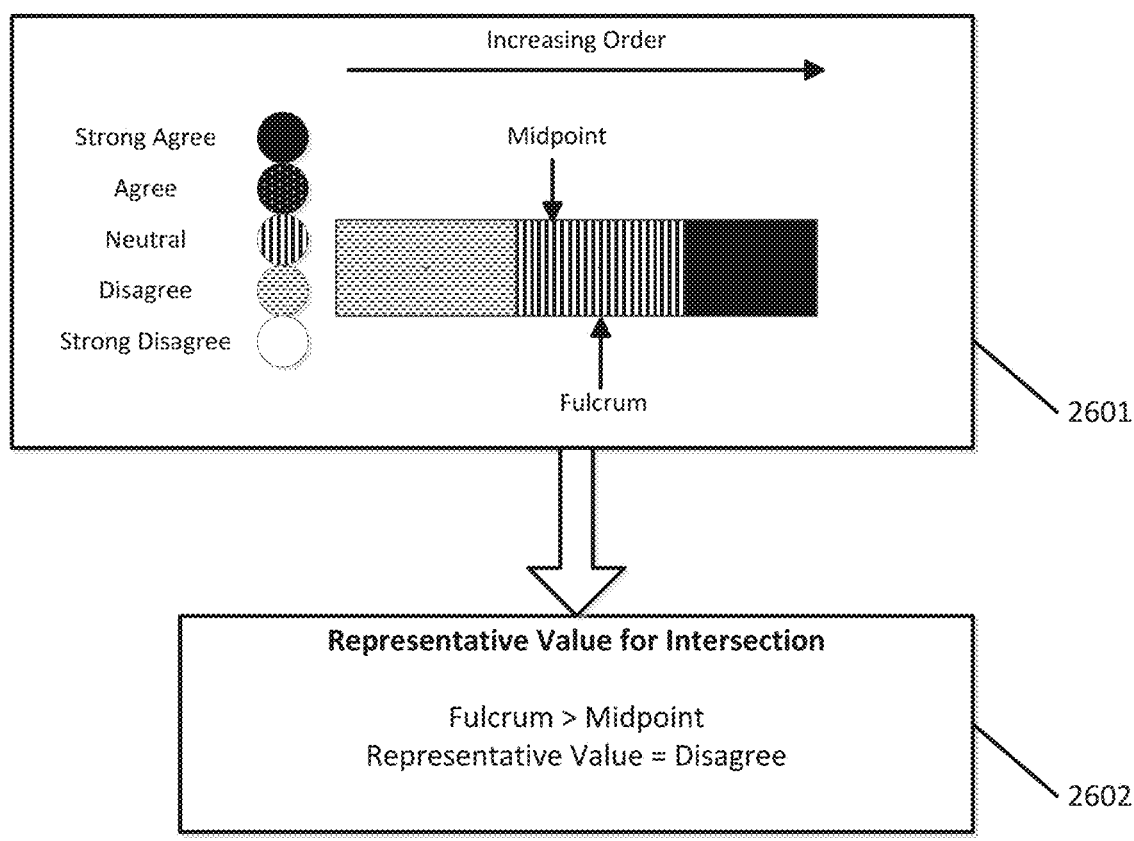
FIG. 26 illustrates a bar chart based on total quantities according to an exemplary embodiment.

Of course, there are several different types of charts that can be used to determine the fulcrum and midpoint. For example, rather than a pie chart, a bar chart can be used. FIG. 26 illustrates an example of a bar chart 2601, based on the total quantities of FIG. 24, which results in the same representative value for the intersection, as shown in box 2602. Additional charts are possible, and all that is required is that the chart provides a spatial representation of the total quantities and the sort order.

Returning to FIG. 1, at step 104 a three-dimensional representation comprising one or more indicators corresponding to the one or more intersections is generated. A visual attribute of each indicator in the one or more indicators can reflects a representative value corresponding to that intersection. As discussed in greater detail below, the visual or audible attribute can include color, transparency, orientation, blink rate, vibration, swell, geometry, texture, size, volume, musical note, and/or any other visual or audible attributes. Additionally, the one or more indicators can be organized within the three-dimensional representation along three axes, as discussed earlier. Furthermore, multiple metrics (including the representative value) can be computed for each intersection and those metrics can also be displayed in the three-dimensional representation using multiple layers.

Figure 27A:
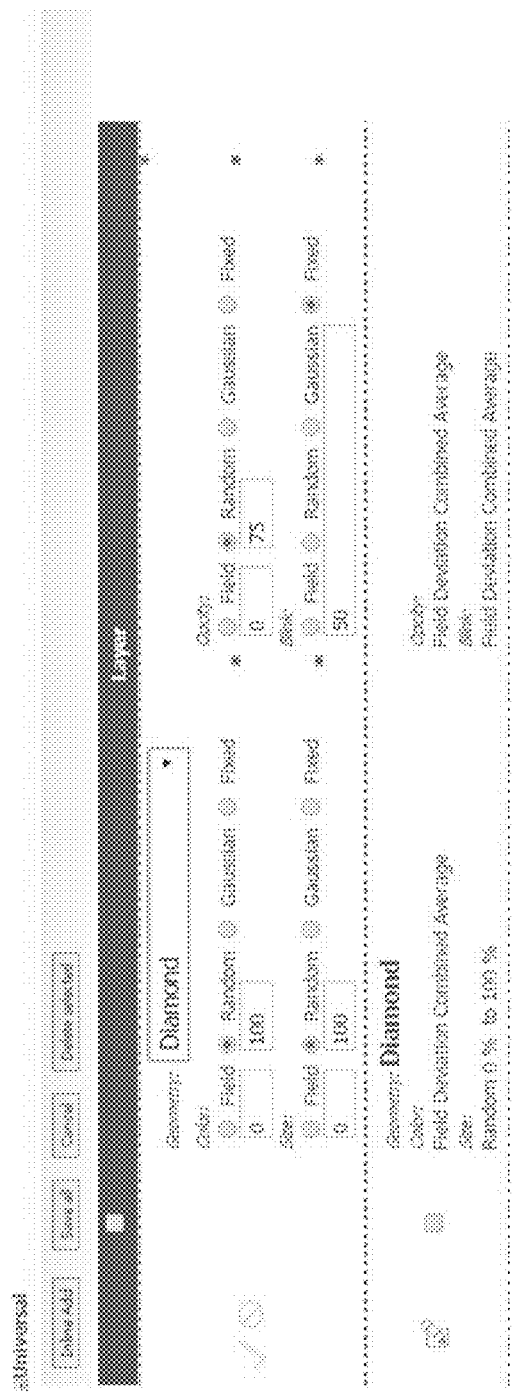
FIGS. 27A-27F illustrate interfaces for configuring the three-dimensional representation according to an exemplary embodiment.

All aspects of the three-dimensional representation can be customized by a user. FIG. 27A illustrates an interface 2700 allowing a user to customize aspects of the layers shown in three-dimensional representation. The layers allow for the generation of multiple shapes at each intersection, each shape corresponding to a different metric which is calculated based on data corresponding to intersection. As shown in interface 2700, different layers can be represented using different geometrical shapes, and the visual attributes of the geometrical shapes can themselves be customized, such as by selecting color, size, opacity, and/or blink rate.

The three-dimensional representation uses shape layers to display statistics contained in each intersection. If multiple layers of shapes are used, then each intersection shows their shapes 'overlaid' on top of each other. Shape layers are rendered based on fixed values and statistical values. For shape layer fixed values, the same values are applied to all the shapes in that layer. Shape fixed values are shape, x-y rotation, y-z rotation and padding.

All shapes in the layer appear as the same shapes and can include shapes such as Cube, Diamond, Cone, Pyramid, Bar, Ball, Donut, Disc, Smartie, Smiley, Puppy, or any other 3D shape or user-created and imported shape.

All the shapes rendered in the layer can be rotated to the same degrees in either the x-y or y-z direction, allowing for full 3D rotation so that overlaid shapes are easier able to be differentiated from other shape layers. The shapes in each layer can also be padded to insert spacing in between shapes. Shape variable values are used to look up values from statistics/variables and assign them to specific attributes when rendering the layer's shape at each intersection. Each intersection shape in the layer can either use a fixed value provided to render its size, color and/or transparency or use any of the matching statistic's percentage information that's found at each intersection for these attributes. Additionally, the shape layer's color can be set to 'Choice', which results in using the or blend of all the colors used in the area chart(s) for any process in that intersection. Transparency is the opacity (RGB alpha) value of the shape at each intersection.

Figure 27B:
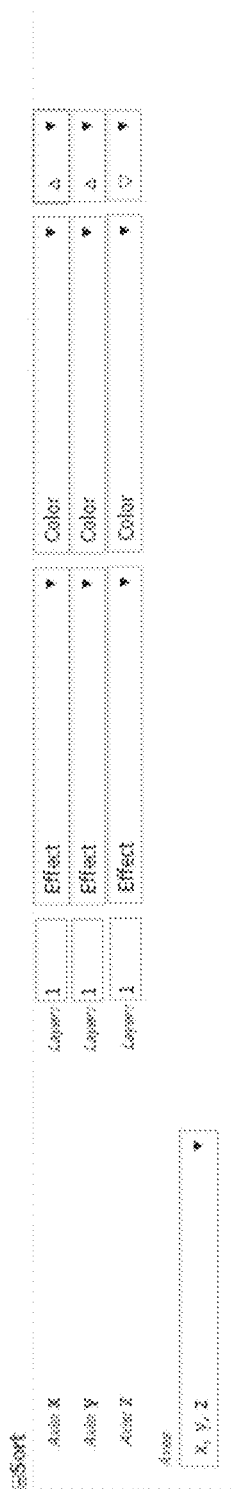

FIG. 27B illustrates an interface 2701 which allows a user select sorting options for each axis in the three-dimensional representation. The user can select layer effect values to which each sorting command applies (such as color, size, etc.), as well as sorting parameters, and sort order. Sort orders can include ascending, descending, inwards, outwards and original/no sort. Because axis' planes contain an average and sum of each of their intersection's statistics, sorting on the axis helps produce cubes that can show with the most clarity where 1) for single intersections, the larger or smaller results are or 2) for compare intersections the conflict or consensus is.

Figures 27C, 27D:
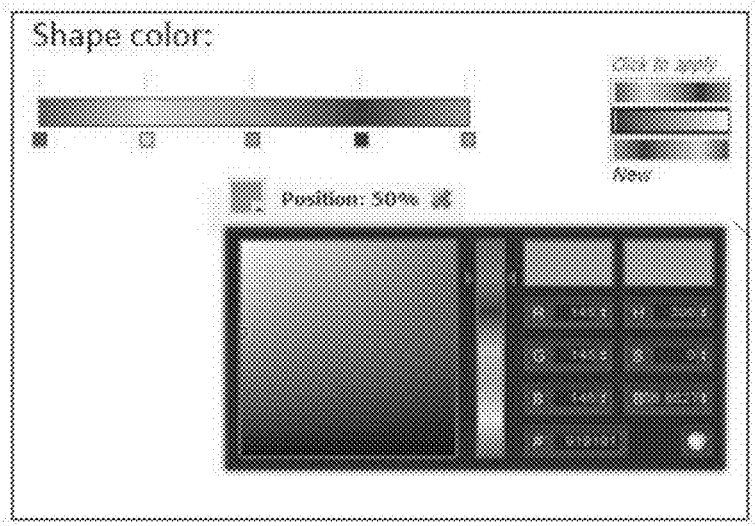

FIG. 27C illustrates how various axis' sorting can produce different areas of concentration within the cube. Axis histograms, as well as calculations of the individual intersection sort values along into cluster density pattern analysis can be used to assign values to each sort combination cube as an alternative way to help the user find concentrate the most relevant information into parts of the cube, for the easiest exploration. It is also possible to bypass this algorithm assisted semi-automated sorting and instead sort the axis directly on any field in the statistics or summaries.

FIG. 27D illustrates an interface 2702 which allows a user to customize visual attributes of shapes corresponding to each intersection. As shown in interface 2703, the user can select display parameters such as the color gradient/scheme applied to intersections and can set different metrics computer based on data in the intersection to different visual attributes of the shapes. For example, the user can set a predominate conviction (level of support) in response to an expressed query of the intersection to a transparency of a shape while at the same time setting the representative value corresponding to the intersection to a color of the shape.

Figure 27E:
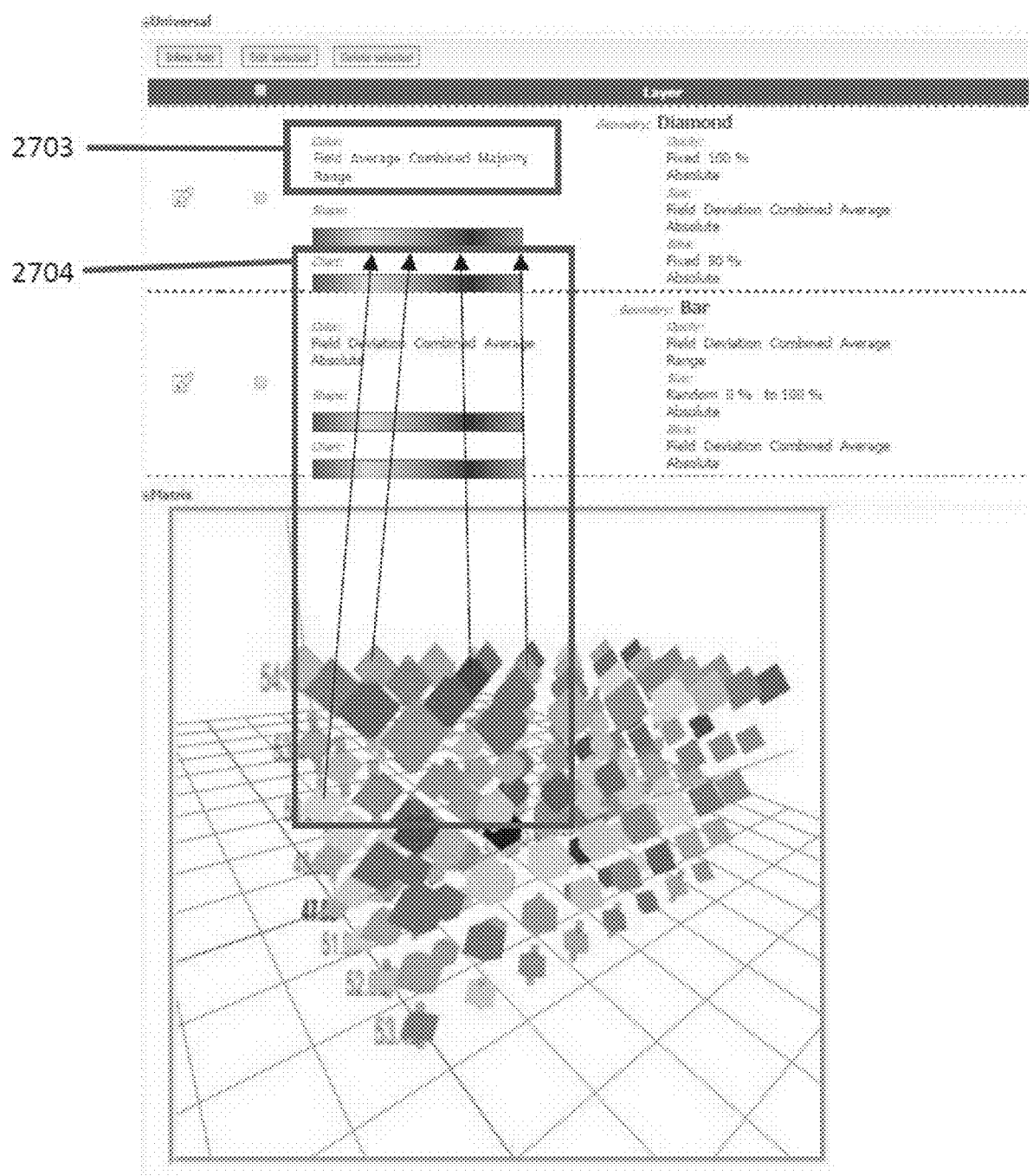

FIG. 27E illustrates how certain metrics (box 2703) can lookup values on the color gradient to determine the shape's color (box 2704).

Figure 27F:
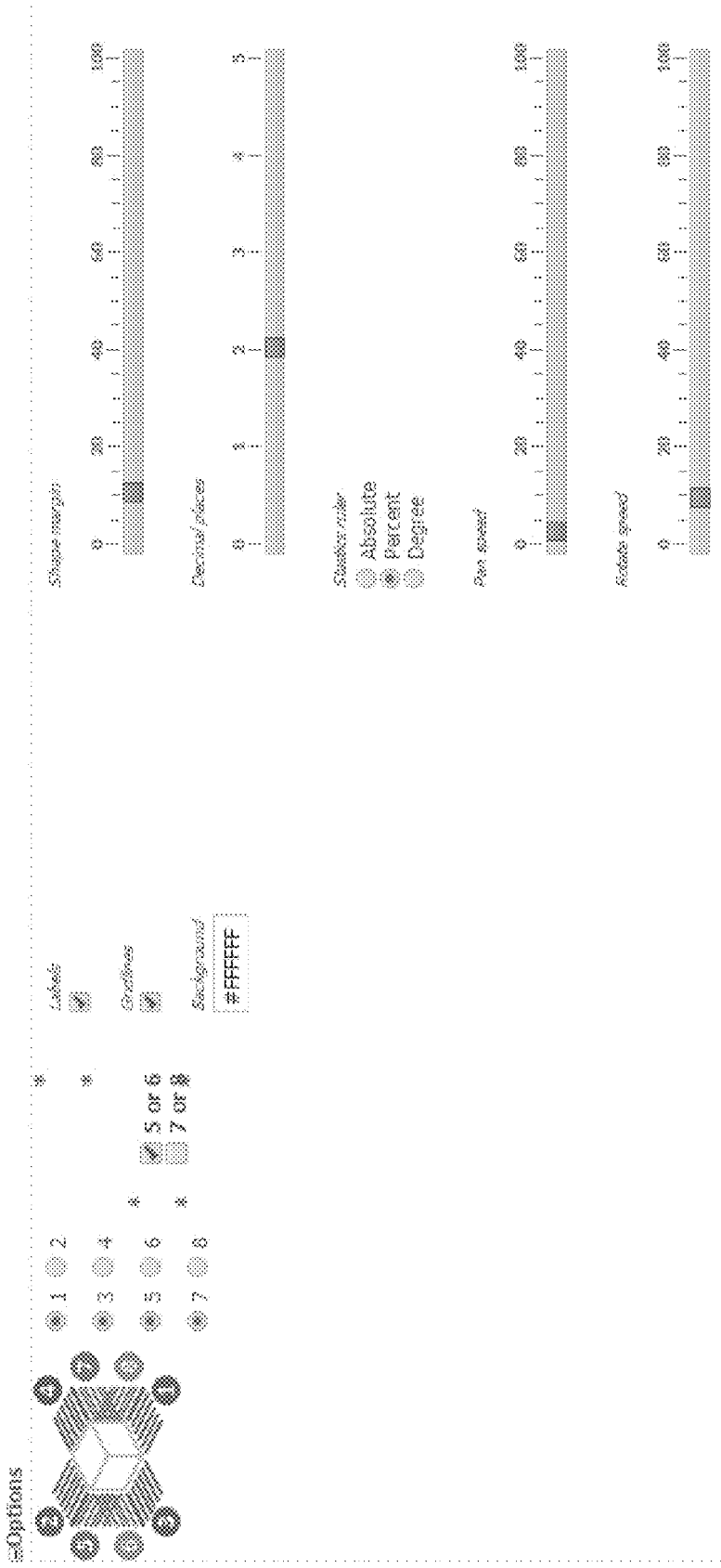

FIG. 27F illustrates another interface 2705 which allows a user to designate how they would like to organize and display labels along the axes of the three-dimensional representation. The x, y, z plane labels are optionally displayed at the edges of the three-dimensional representation, and their locations can be chosen by an 'edge location' selector control so that as the three-dimensional representation rotates only the corresponding edge displays its labels. Hovering or clicking on any of the x, y and z lattices lines or plane labels pops up all the average, sum and difference for its statistics (calculated using all the intersections along its line or plane). Additionally, once the user zooms into the matrix (such that the edges of the three-dimensional representation are outside the viewer) the labels which are used in the viewer appear in a border area to facilitate locating the view of inside the cube.

Interface 2705 also allows users to identify the precision of any metrics that are displayed, as well as pan and/or rotate speeds. Additional interfaces can be used to allow the user to select a zoom speed, set a background color based on metrics, and set other global settings to facilitate altering the presentation of information for user requirements and output methods.

Figure 28:
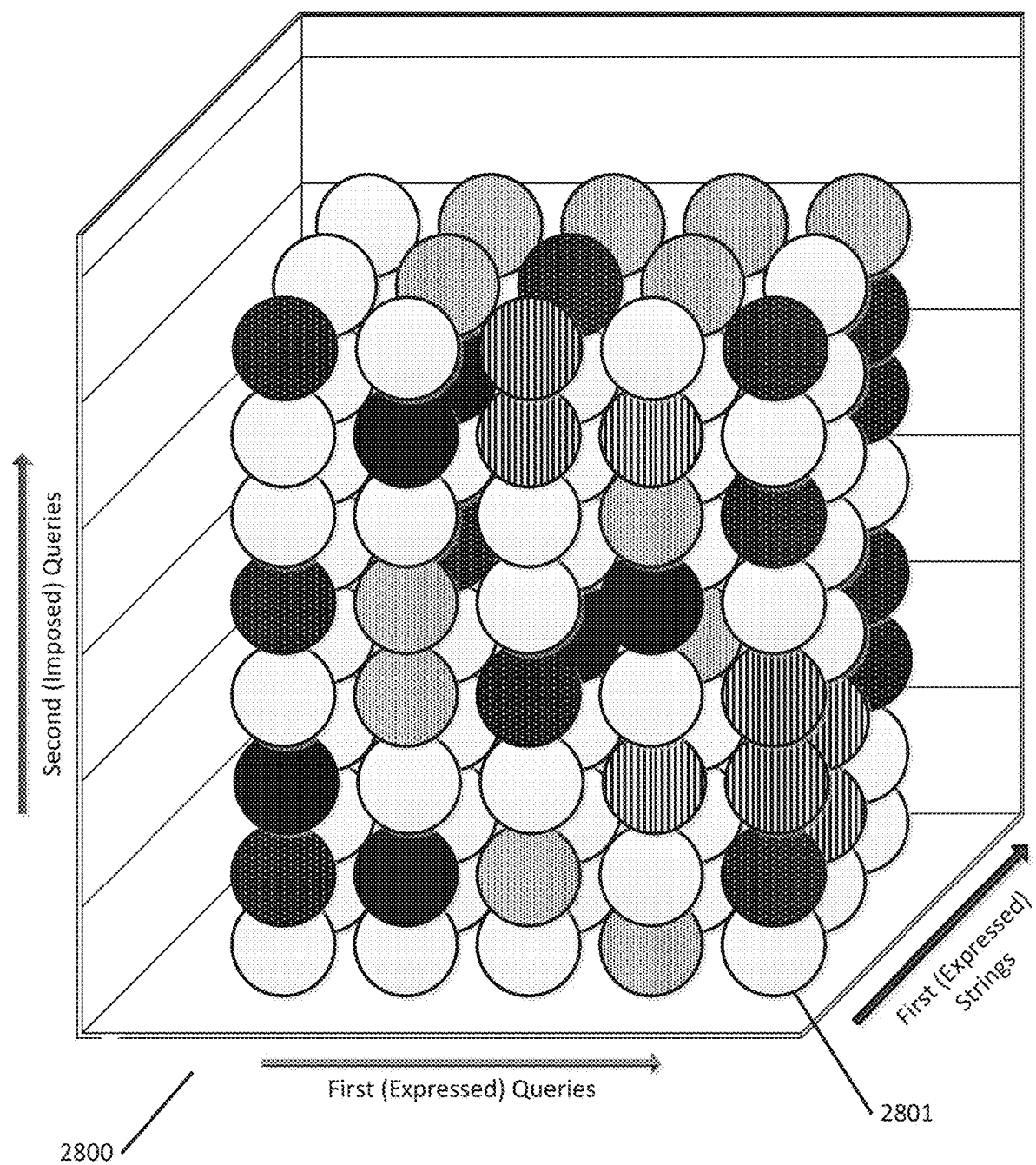
FIG. 28 illustrates an example of a three-dimensional representation according to an exemplary embodiment.
Figure 29A:
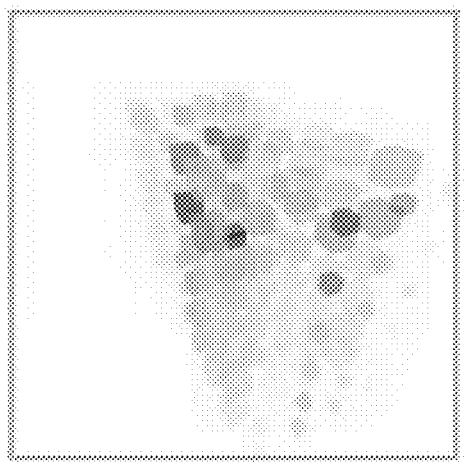
FIGS. 29A-29H illustrate additional examples of the three-dimensional representation using various shapes, perspectives and visual settings according to an exemplary embodiment.
Figure 29B:
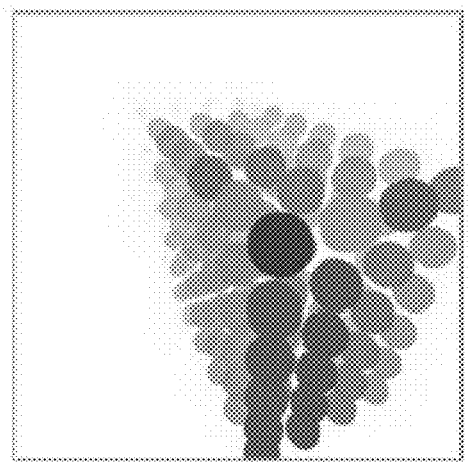
Figure 29C:
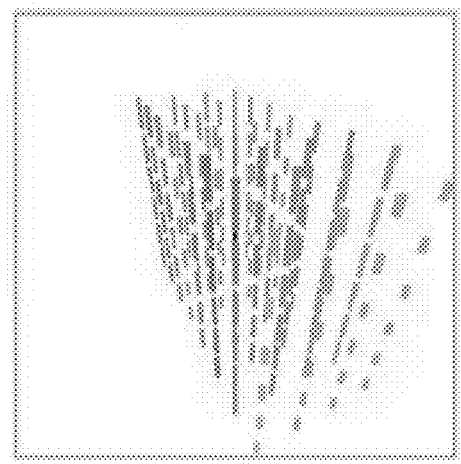
Figure 29D:
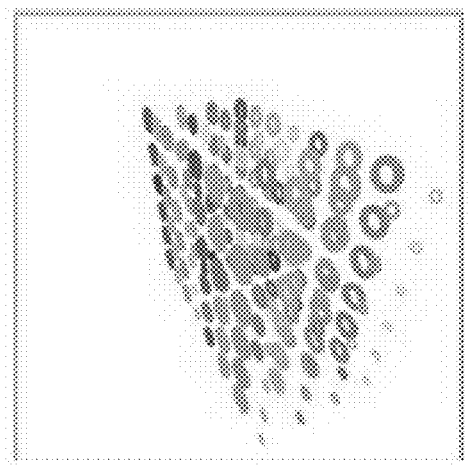
Figure 29E:
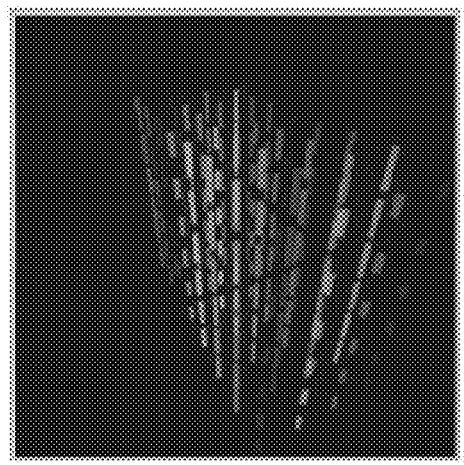
Figure 29F:
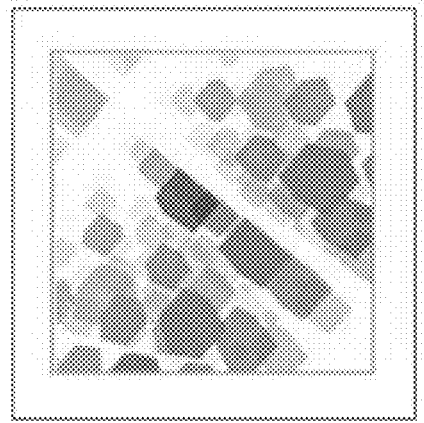
Figure 29G:
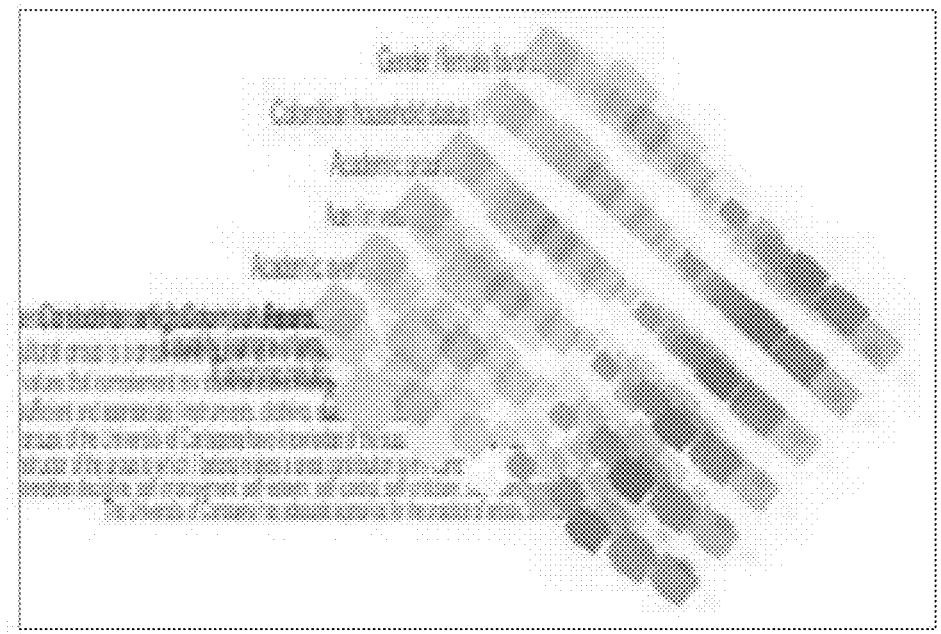
Figure 29H:
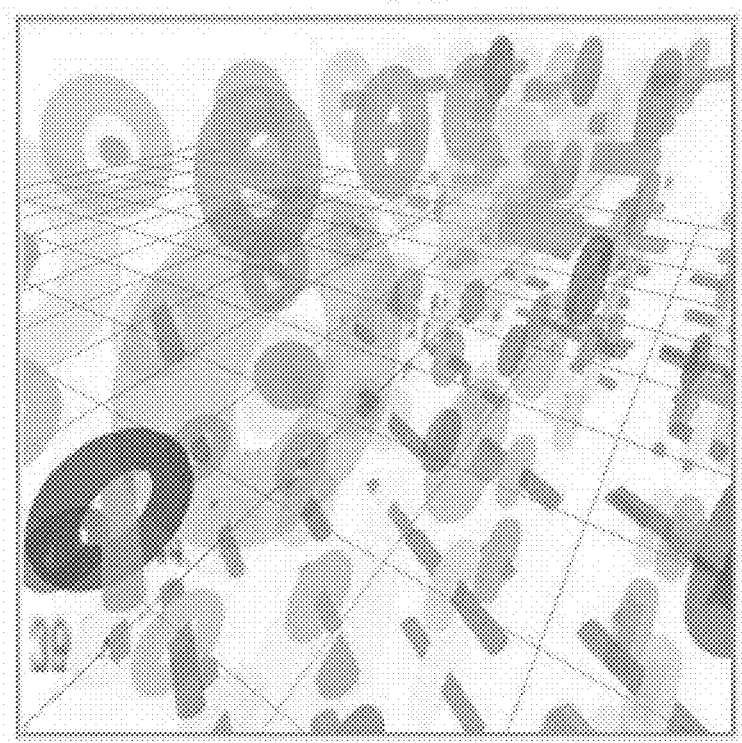

FIG. 28 illustrates an example of a three-dimensional representation 2800 comprising a plurality of indicators corresponding to a plurality of intersections. As shown in FIG. 28, the indicators are organized according to three axes, x, y, and z. In this particular example, first queries are mapped to the x-axis, second queries are mapped to the y-axis, and first strings are mapped to the z-axis. Additionally, one or more second strings are mapped to the u-plane and apply to all the intersections shown in the figure. For example, indicator 2801 corresponds to an intersection of a first query, first string, second query, and one or more second strings. Of course, the mapping of the queries and strings to various axes can be customized by the user. For example, one or more imposed queries or one or more expressed strings can be mapped to the u-plane.

A visual attribute of each of the indicators indicates a metric generated based on data in the intersection, such as representative value. For example, the pattern of indicator 2801 would indicate, based on the conventions shown in FIG. 26, that the representative value for the intersection corresponding to that indicator is "Strong Disagree." Of course, for a more nuanced representation of the data, multiple visual attributes can correspond to values of multiple different metrics and multiple layers can also be utilized to indicate the values of different metrics (for example, using the fulcrum or majority for a more precise value producing more nuanced shape colors using the interface shown in FIG. 27D).

Each intersection can correspond to a variety of different combinations of first queries, second queries, sets of first strings, and sets of second strings. For example, each intersection can correspond to a first query, a first string, a second query, and a second string. Each intersection can also correspond to a first query, a first string, a second query, and two second strings. In this case, the two second strings can be applied iteratively to the values in the intersection to determine the appropriate metrics. Additionally, each intersection can correspond to a comparison between a first query, a first string, a second query, and a second string and the first query, the first string, the second query, and a different second string. In this case, the representative value or other metric indicated by the indicator can be based upon some comparison between each set of values, such as a difference in fulcrums.

For clarity, several of the features discussed with reference to FIGS. 27A-27F are not shown in FIG. 28. However, it is understood that FIG. 28 can incorporate any of the features described with respect to FIGS. 27A-27F. FIGS. 29A-29H illustrate additional examples of the three-dimensional representation using various shapes, background colors, border areas to display labels once the user has zoomed inside the boundaries of the three-dimensional representation, possible placement of labels, and amount of shape layers.

A user can examine particular intersection shown in the three-dimensional representation more closely by selecting an indicator in the plurality of indicators. Specifically, the system can receive a selection of an indicator, the indicator corresponding to an intersection in the one or more intersections, and generate a graph comprising a representation of the weighted set of first responses and the weighted at least one set of second responses.

This graph can combine each weighted first response of a source to a first query of that intersection with a corresponding weighted at least one second response of the source to at least one second query of that intersection. The graph can be an area chart including a plurality of areas corresponding to the plurality of sources (such as users). A first attribute of each area in the plurality of areas can indicate the first response of a corresponding source to the first query. A second attribute of each area in the plurality of areas can indicates the at least one second response of the corresponding source to the at least one second query. A third attribute of each area in the plurality of areas can indicate a weighting applied to the first response of the corresponding source. A fourth attribute of each area in the plurality of areas can indicate a weighting applied to the at least one second response of the corresponding source. The graph can be, for example, a bar chart as shown in box 2301 of FIG. 23. In this case, the first attribute is the bar pattern (corresponding to agreement level), the second attribute is the bar position (corresponding to grades), the third attribute is width (corresponding to the weighting of agreement level), and the fourth attribute is height (corresponding to the weighting of grades).

Additional information can also be displayed when a user selects a particular indicator in the plurality of indicators of the three-dimensional representation. FIG. 30 illustrates the various charts and statistics that can be displayed for an intersection when a user selects an indicator corresponding to that intersection. In this case, the intersection has one first query and one first string (3001), and one second query and one second string 3002. Each query-string has its results go through 5 processes. The five processes are Scaled 3003, Acknowledged 3004, spaced 3005 counted 3006 and stringed 3007. Once all the query-string results have gone through the stringing process, the stringed results their final process of being combined. All the processes on either the individual query-strings or else the combined results—except for scaled—are displayed using the following components: bar graph 3008, statistics table 3009, pie chart 3010, summary information 3011 and stacked bar chart 3012. The summary information contains the fulcrum, along with the majority value which is larger of the fulcrum and its compliment; as well as a "Winner" which is deduced from the representative value described earlier in this specification.

Figure 31A:
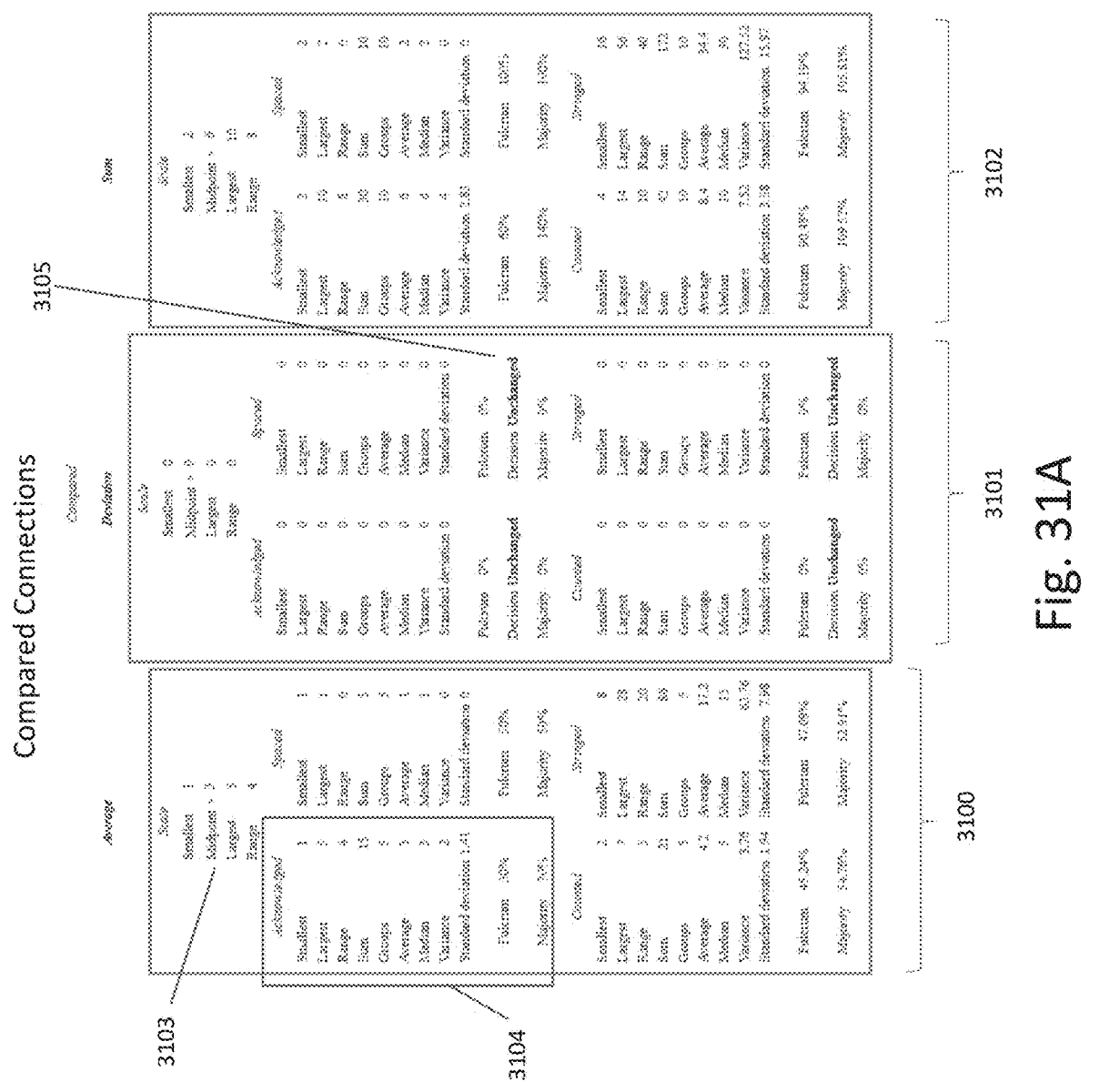

FIG. 31A illustrates an example of the various statistics and summary information that that can be displayed for an intersection in response to select of an indicator when each intersection corresponds to the same query with more than one first string and more than one second string. This is possible when more than one string and/or more than one query is mapped to the u-plane. This intersection can be referred to as a compared intersection and allows for the comparison of different sets of values: {first query, first string, at least one second query, and at least one second string} and/or {different first query, different first string, at least one different second query, at least one different second string}. For example: compare all the results between passionate males against calm females, or compare all the results between branch earners who are starting up against older branches which are reporting low earnings, etc. In this case, a compared column presents three ways that the two sets of values produced during processing of each query-string before being combined can be connected—through averaging the values 3100, summing the values 3101, or finding the difference (deviation) between the values 3102. At each stage of processing connections are made between all the values of the statistics and summary information 3104, except for the scaled process 3103 which connects the values from the scales. When connecting via deviation, an additional "Decision" field is rendered for each connection of summary information regarding whether the winners are equal ('Unchanged') or unequal ('Changed').

Figure 31B:
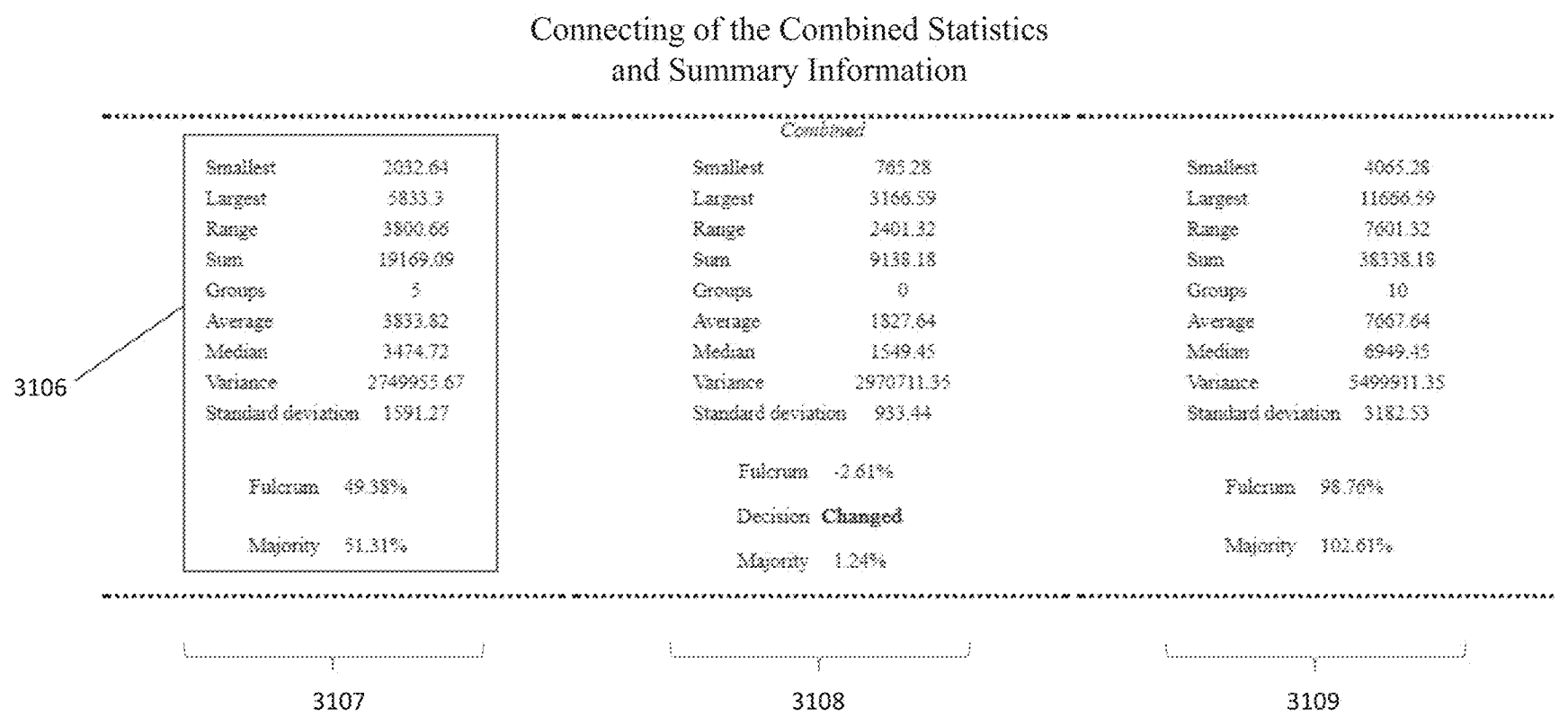

FIG. 31B illustrates the connecting of the Combined statistics and summary information 3106 using the Sum 3107, Average 3108 and Deviation 3109 connecting methods.

Figure 31C:
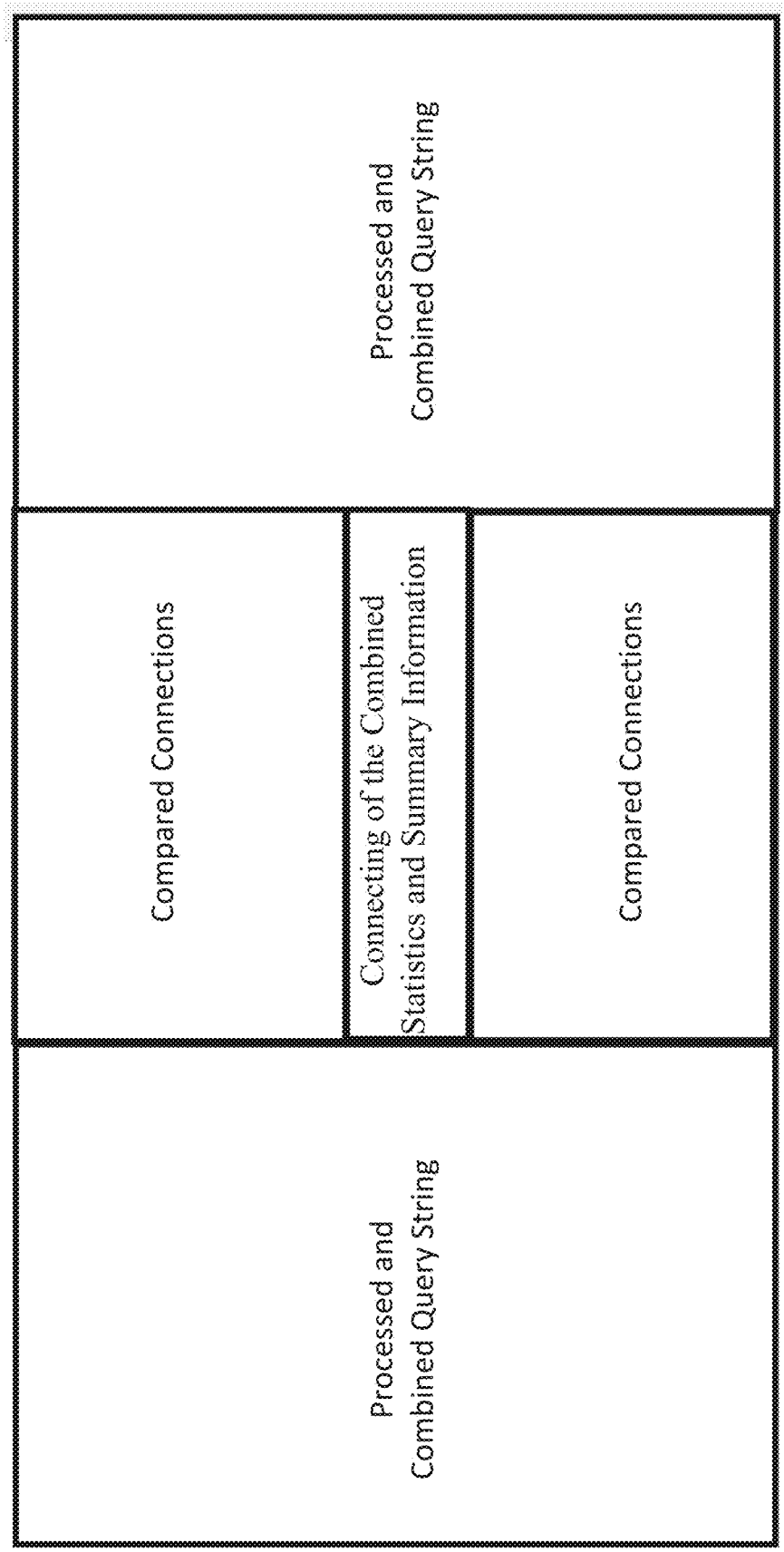

FIG. 31C illustrates a complete rendering of a compared intersection, being a composite of two processed and combined query-string sets (one of each FIG. 30), compared connections for each of them (one of each FIG. 31A) and compared connections for their combined values. Each of the query-string process in the composite produces a blend color which can be used to color the shape in the cube. Each numeric value produced in the statistics and summary information can also be plotted in various ways (absolute or in relation to all the other intersections' same fields with optional trimming) along a color spectrum and the color found can be used to color the intersection's layer's shape. Any of the text fields generated can also be mapped onto a color to be used to color the shape.

Figure 31D:
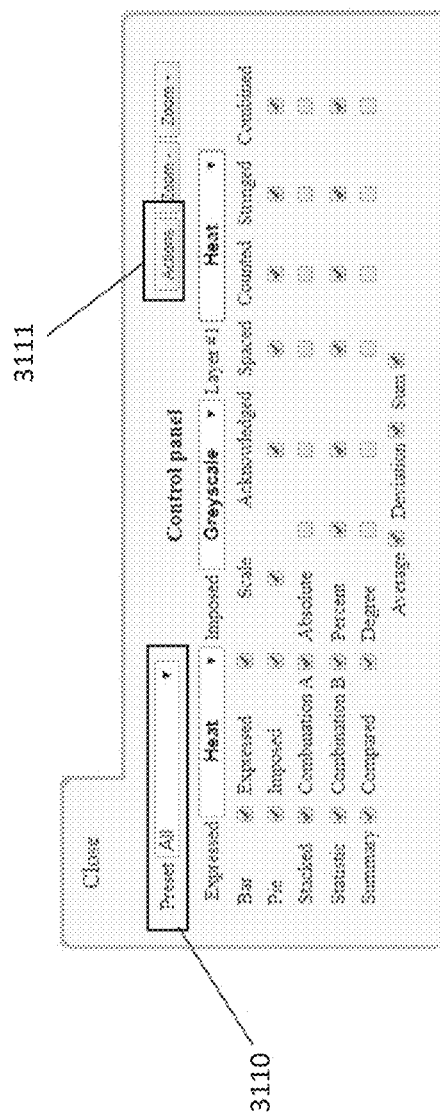

FIG. 31D illustrates a control panel can be presented which allows users to set visual attributes and presence of the various charts and statistics. Box 3110 shows the Preset select control. When set to 'Visual' the preset can present an intersection with visual information such as graphs and charts. When set to 'Minimal' the preset can present an intersection with a minimal amount of statistical information and visual information. When set to 'Numbers' the preset can present an intersection with only numerical and statistical information and no visual information. Box 3111 shows an Actions button which can reveal ways for the user to invoke more actions on the intersection, such as 1) copy the intersection into a sandbox for collecting with others, 2) commenting and sharing, 3) launch a new StringCubes based on the selection for that intersection, 4) center the camera around that intersection, 5) show referential replies (text, formatted text, document uploads, images, links, etc.) and other features.

Figure 31E:
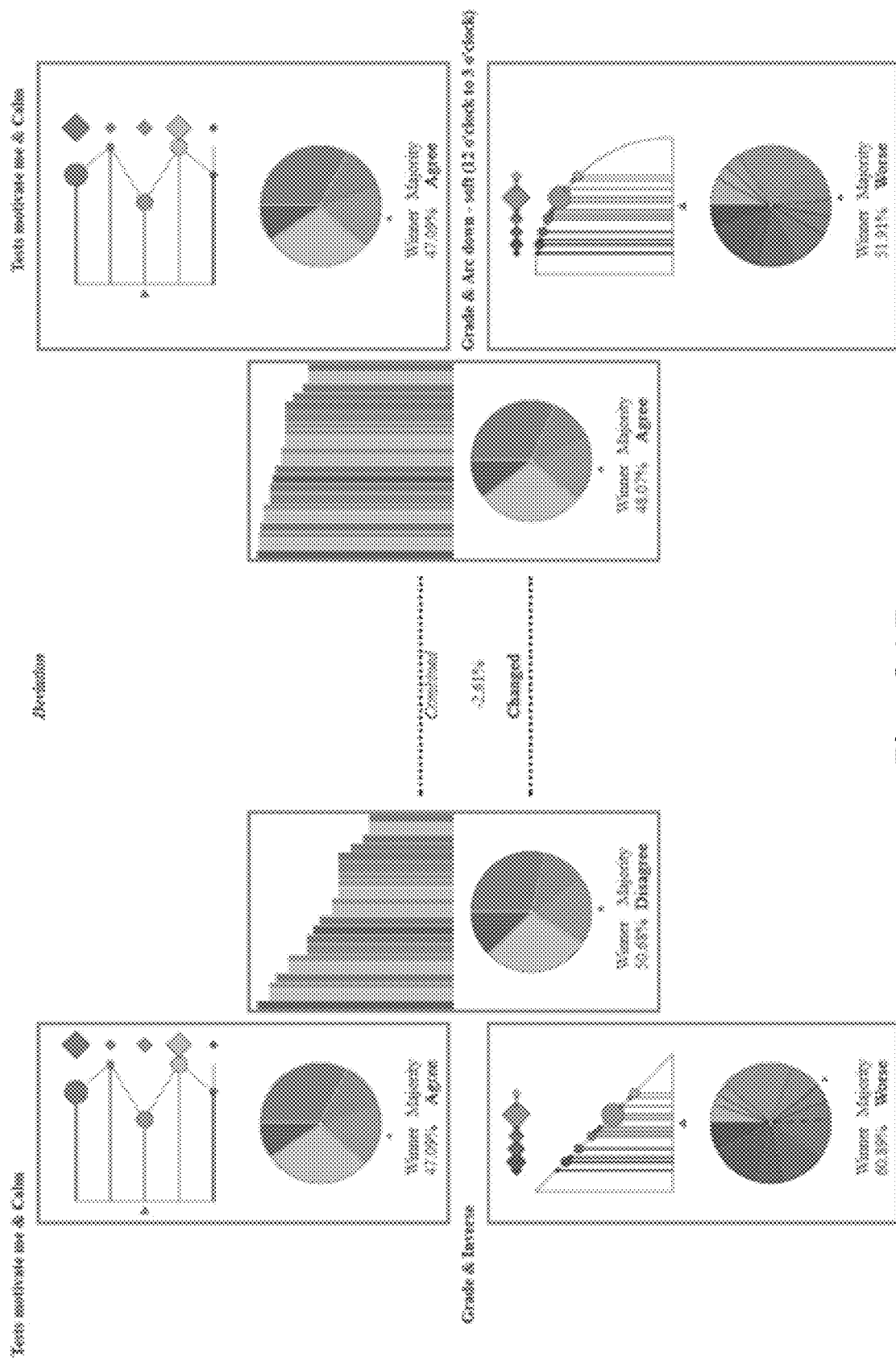

FIG. 31E illustrates an example of the same intersection as shown in FIG. 31C except with a control panel configuration to show only a portion of the available information; as to permit easier viewing for the user.

Figure 32:
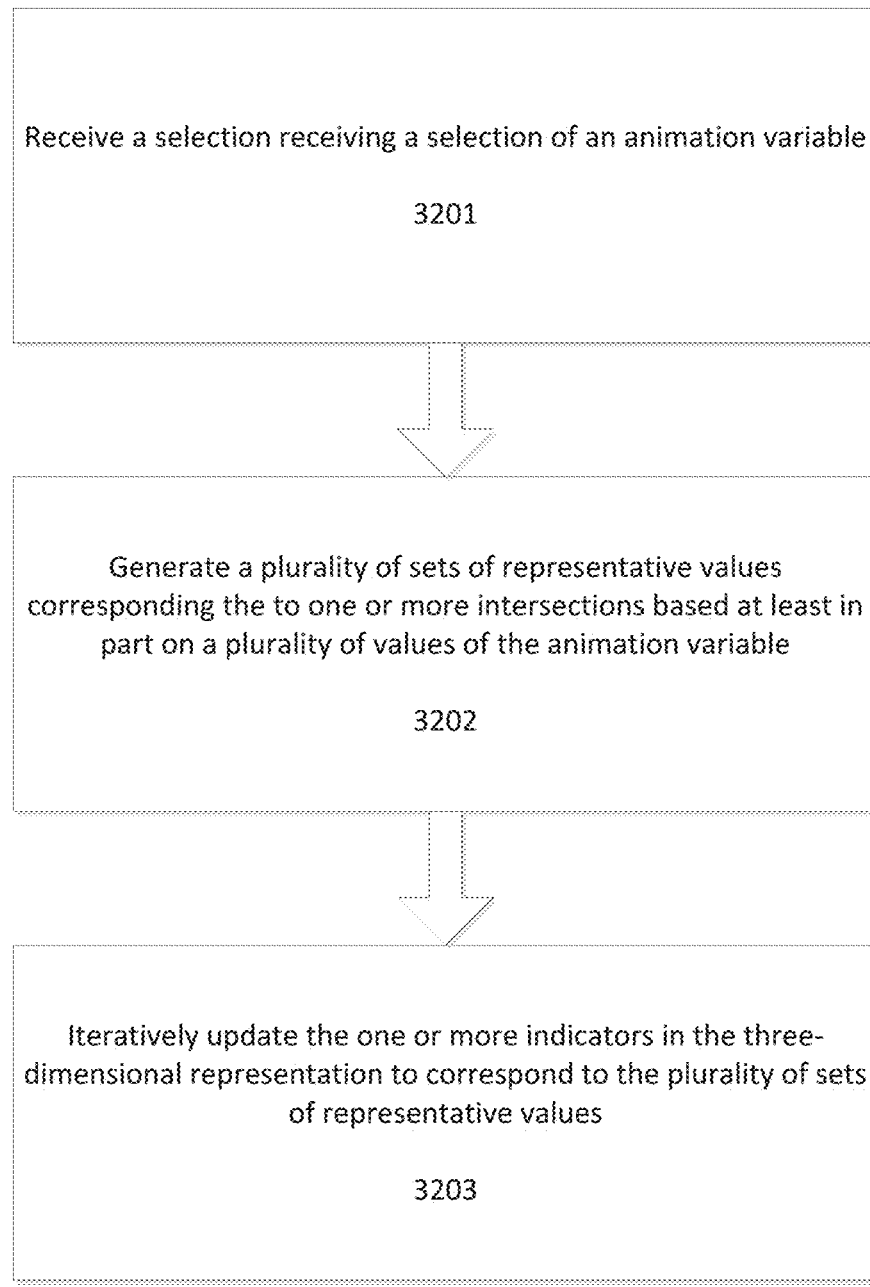
FIG. 32 illustrates a flowchart for animating the three-dimensional representation according to an exemplary embodiment.
Figure 33A:
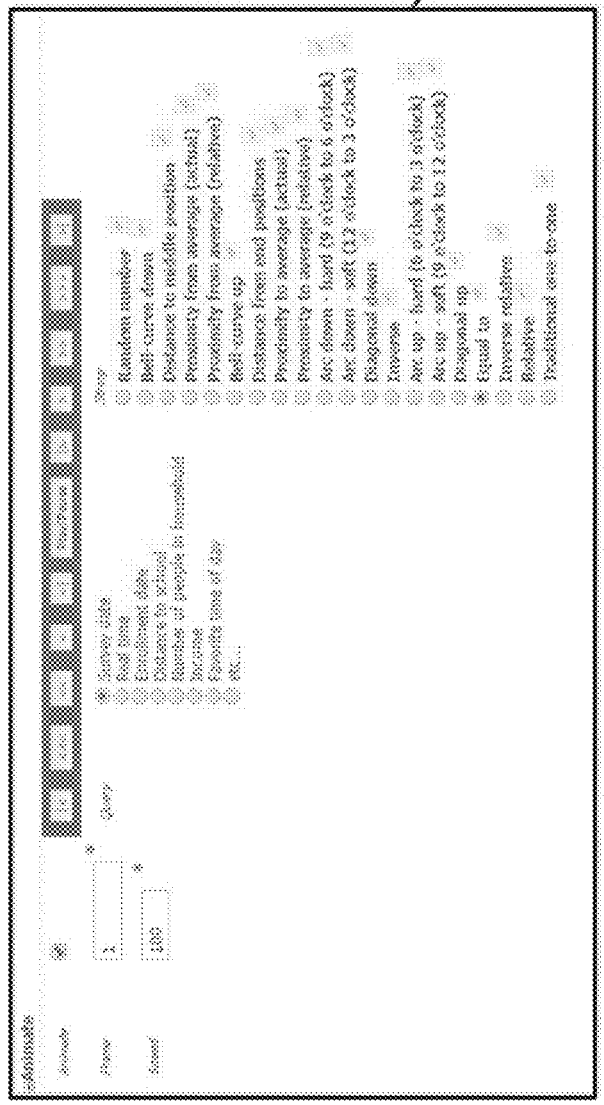

FIG. 32 illustrates a flowchart for animating the three-dimensional representation according to an exemplary embodiment. At step 3201 a selection of an animation variable is received. FIG. 33A illustrates an interface 3301 for entering the animation variable and other animation settings. In this particular example, the user has selected survey date as the animation variable. The user can also select a string to apply to the animation variable. In this case, the user has selected equal to. As shown in interface 3301, a user can also set other parameters, such as frame and speed.

At step 3202 of FIG. 32 a plurality of sets of representative values corresponding to one or more intersections are generated based at least in part on a plurality of values of the animation variable. Each set of representative values in the plurality of sets of representative values corresponds to a value of the animation variable in the plurality of values of the animation variable.

At step 3203 of FIG. 32, the one or more indicators in the three-dimensional representation are iteratively updated to correspond to the plurality of sets of representative values. This updating can be based on the selected frame and speed of the user and results in the animation of the three-dimensional representation to illustrate changes and/or trends as the value of the animation variable changes.

Figure 33B:
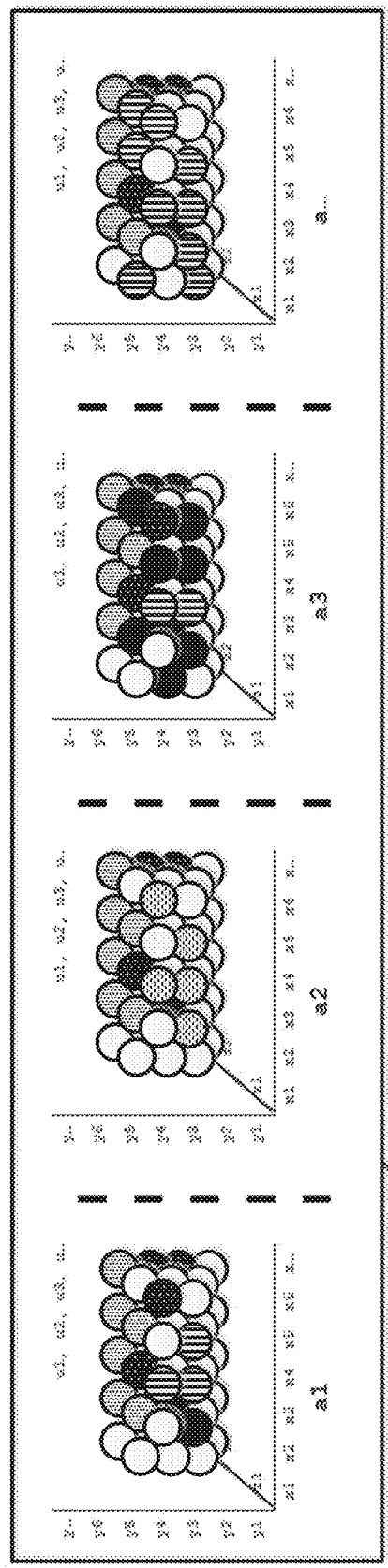

The animate plane (a-plane) will now be described in greater detail. The a-plane extends the functionality of the three-dimensional representation by allowing for an additional, flexible query and string to be added and the allowing for displaying the values produced as the framerate of an animation, as shown in box 3301 of FIG. 33B.

The x, y, z and u-planes:

(1) Follow the same rules set out already (ie: totaling an equal number of query collections and string collections, which are paired and ordered, the first string can be expressed strings, and the u-plane can be single or comparison of two queries or strings).

(2) During animations, the values corresponding to the x, y, z and u-planes don't change, nor does their order.

(3) The a-plane doesn't add any extra vectors or calculations to the intersection bar chart.

(4) Each intersection along the animation frames have their query data filtered by stacking the a-plane query on to the end of its x, y, z and u values when retrieving data (for example: At this frame only retrieve results from x, y, z and u queries when the a-plane query fiscal year acknowledged reply is 1980).

The a-plane:

(1) Contains one query and one string.

(2) Allows for dynamic transitioning with pause, play, fast/slow/step forward/backward, etc. controls which transitions the three-dimensional representation from one filtered result set to another by locating each a-plane three-dimensional representation filtered result on an animated 'movie' timeline. The placement of the filtered three-dimensional representation transitions on the timeline is based on the flexible query and string which are selected for the animation plane.

(A) A sequential index can be expressed using the formula:

Animation_Length*Index/Count(Flexible_Stringed_Values))

(B) The frame's query reply's location can be expressed in relation to a high and low trimmed scale of all a-plane replies using the formula:

If(Index==0,0,Animation_Length*(Reply_Value–Smallest_Stringed_Value)/(Largest_Stringed_Value–Smallest_Stringed_Value)

(3) Takes statistics and summaries for each frame which can be used to set background color and border color of the animation frame.

(4) Can be used to generate avi, mpg, animated gif, mov, etc files.

FIG. 33C illustrates an example of how StringCube snapshot frames are placed along the animation timeline according to calculations done on each frame's index, and where the staging of the frames is smoother and independent of the actual stringed value found for each frame. FIG. 33D illustrates an example of how StringCube snapshot frames are placed along the animation timeline according to calculations done on each frame's stringed value, and is more accurate as they are animated according to the stringed value found. FIG. 33E illustrates how placing different queries or strings along the a-plane (as well as other planes) then the animate can reveal chronological, cyclical, geographical, etc. attributes of the data.

As discussed throughout the application, the methods and systems described herein can be used to encode inequalities into response data received in response to queries and model relationships between the encoded response data/queries based on statistical data. FIG. 34 illustrates a table 3400 showing the various objects, processes, and statistics that can be used in the present system and method. Of course, table 3400 is not exhaustive and various other objects, processes, and statistics can be utilized.

The three-dimensional representation can also be transformed to display indicators using stereoscopic images, such that a user viewing the three-dimensional representation can perceive depth along the z-axis. This functionality allows users to better perceive all the data points in the three-dimensional representation.

Figure 35:
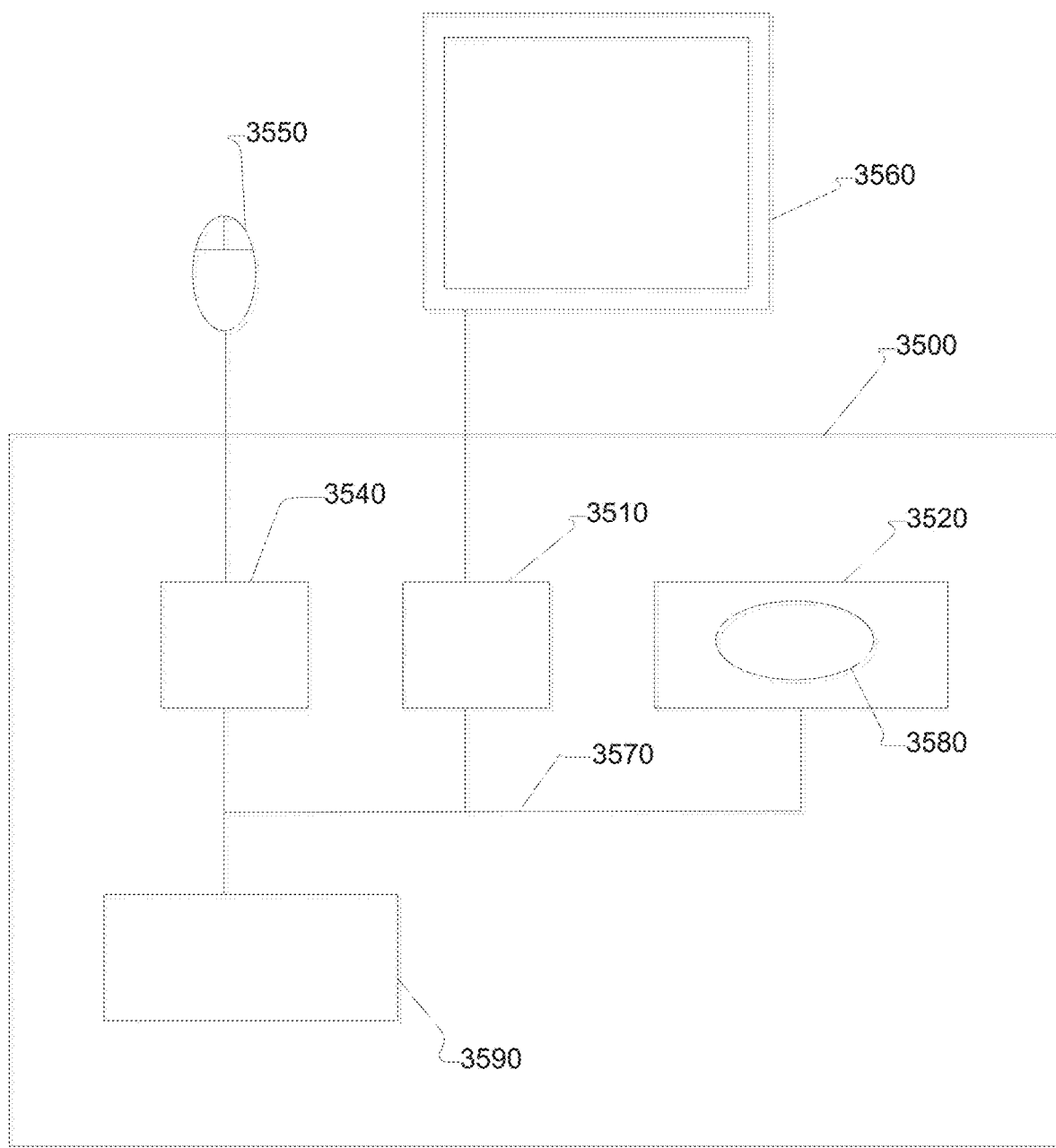
FIG. 35 illustrates an exemplary computing environment that can be used to carry out the method for modeling relationships between query responses in a data set.

FIG. 35 illustrates an example of a computing environment 3500 that can be used to implement the methods and systems described herein. The computing environment 1300 is not intended to suggest any limitation as to scope of use or functionality of a described embodiment.

With reference to FIG. 35, the computing environment 3500 includes at least one processing unit 3510 and memory 3520. The processing unit 3510 executes computer-executable instructions and can be a real or a virtual processor. In a multi-processing system, multiple processing units execute computer-executable instructions to increase processing power. The memory 3520 can be volatile memory (e.g., registers, cache, RAM), non-volatile memory (e.g., ROM, EEPROM, flash memory, etc.), or some combination of the two. The memory 3520 can store software instructions 3580 for implementing the described techniques when executed by one or more processors. Memory 3520 can be one memory device or multiple memory devices.

A computing environment can have additional features. For example, the computing environment 3500 includes storage 3540, one or more input devices 3550, one or more output devices 3560, and one or more communication connections 3590. An interconnection mechanism 3570, such as a bus, controller, or network interconnects the components of the computing environment 3500. Typically, operating system software or firmware (not shown) provides an operating environment for other software executing in the computing environment 3500, and coordinates activities of the components of the computing environment 3500.

The storage 3540 can be removable or non-removable, and includes magnetic disks, magnetic tapes or cassettes, CD-ROMs, CD-RWs, DVDs, or any other medium which can be used to store information and which can be accessed within the computing environment 3500. The storage 3540 can store instructions for the software 3580.

The input device(s) 3550 can be a touch input device such as a keyboard, mouse, 3D mouse, motion tracking controller, pen, trackball, touch screen, or game controller, a voice input device, a scanning device, a digital camera, remote control, or another device that provides input to the computing environment 3500. A handheld device can be used to supply query replies in real-time to a computing environment. A desktop device can supply strings in real-time to a computing environment. The output device(s) 3560 can be a display, television, monitor, virtual reality system, printer, speaker, or another device that provides output from the computing environment 3500.

The communication connection(s) 3590 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 3500, computer-readable media include memory 3520, storage 3540, communication media, and combinations of any of the above.

Of course, FIG. 35 illustrates computing environment 3500, display device 3560, and input device 3550 as separate devices for ease of identification only. Computing environment 3500, display device 3560, and input device 3550 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 3500 can be a set-top box, mobile device, personal computer, or one or more servers, for example a farm of networked servers, a clustered server environment, or a cloud network of computing devices. Additionally, the systems and methods disclosed herein can be implemented as a web application which is accessed through a browser and over a communication connection.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of the described embodiment shown in software can be implemented in hardware, as discussed above, and vice versa.

In view of the many possible embodiments to which the principles of our invention can be applied, we claim as our invention all such embodiments as can come within the scope and spirit of the following claims and equivalents thereto

I claim:

1. A method executed by one or more computing devices for modeling relationships between query responses in a data set, the method comprising:
   identifying, by at least one of the one or more computing devices, n sets of queries for modeling, where n is a number greater than or equal to two;
   identifying, by at least one of the one or more computing devices, n sets of strings corresponding to the n sets of queries, wherein each string comprises a plurality of weights applicable to a plurality of values in a string dimension, the string dimension for each set of strings comprising a distinct dimension from other string dimensions corresponding to other sets of strings in the n sets of strings;
   determining, by at least one of the one or more computing devices, one or more representative values corresponding to one or more intersections, wherein each intersection corresponds to a unique combination of at least one query from each set of queries in the n sets of queries and at least one string from each set of strings in the n sets of strings and wherein each representative value for each intersection comprises a value in a plurality of values received in response to a target query that is part of that intersection; and
   generating, by at least one of the one or more computing devices, a multidimensional vector comprising one or more elements corresponding to the one or more intersections, wherein each element in the one or more elements comprises the representative value of a corresponding intersection and wherein each dimension of the multidimensional vector corresponds to either a set of queries in the n sets of queries or a set of strings in the n sets of strings.

2. The method of claim 1, wherein determining one or more representative values corresponding to one or more intersections comprises, for each intersection:
  determining n sets of weighted responses by weighting at least one set of responses from a plurality of sources to the at least one query in each set of queries based on the plurality of weights of a corresponding string in the n sets of strings; and
  determining the representative value based at least in part on the n sets of weighted responses.

3. The method of claim 2, wherein determining the representative value based at least in part on the n sets of weighted responses comprises:
  for each source in the plurality of sources, re-weighting a weighted response of that source to the target query by each weighted response of that source to the at least one query in all other sets of queries;
  computing a plurality of total quantities corresponding to the plurality of values received in response to target query by summing all re-weighted responses which correspond to the same value; and
  determining a representative value from the plurality of values based at least in part on the plurality of total quantities.

4. The method of claim 1, wherein each set of queries comprises one or more queries and wherein each set of strings comprises one or more strings.

5. The method of claim 1, further comprising:
  generating, by at least one of the one or more computing devices, a plurality of sets of representative values corresponding the to one or more intersections, wherein each set of representative values corresponds to a different value of a variable; and
  iteratively updating, by at least one of the one or more computing devices, the one or more elements in the multidimensional vector based at least in part on the plurality of sets of representative values.

6. The method of claim 5, wherein iteratively updating the one or more elements in the multidimensional vector based at least in part on the plurality of sets of representative values comprises:
  updating the one or more elements in the multidimensional vector to shift from a first set of representative values for an initial value of the variable to a second set of representative values for a subsequent value of the variable based at least in part on the plurality of sets of representative values.

7. The method of claim 1, wherein the one or more representative values corresponding to one or more intersections comprise a plurality of representative values corresponding to a plurality of intersections, wherein the multidimensional vector comprises a plurality of elements corresponding to the plurality of intersections, and further comprising:
  filtering the multidimensional vector based on one or more attributes to generate a filtered multidimensional vector, the filtered multidimensional vector including at least one representative value corresponding to at least one intersection that matches one or more values of the one or more attributes.

8. The method of claim 1, wherein determining one or more representative values corresponding to one or more intersections comprises, for at least one intersection:
  determining at least one goal; and
  determining the at least one string corresponding to the at least one intersection based at least in part on the determined at least one goal.

9. An apparatus for modeling relationships between query responses in a data set, the apparatus comprising:
  one or more processors; and
  one or more memories operatively coupled to at least one of the one or more processors and having instructions stored thereon that, when executed by at least one of the one or more processors, cause at least one of the one or more processors to:
    identify n sets of queries for modeling, where n is a number greater than or equal to two;
    identify n sets of strings corresponding to the n sets of queries, wherein each string comprises a plurality of weights applicable to a plurality of values in a string dimension, the string dimension for each set of strings comprising a distinct dimension from other string dimensions corresponding to other sets of strings in the n sets of strings;
    determine one or more representative values corresponding to one or more intersections, wherein each intersection corresponds to a unique combination of at least one query from each set of queries in the n sets of queries and at least one string from each set of strings in the n sets of strings and wherein each representative value for each intersection comprises a value in a plurality of values received in response to a target query that is part of that intersection; and
    generate a multidimensional vector comprising one or more elements corresponding to the one or more intersections, wherein each element in the one or more elements comprises the representative value of a corresponding intersection and wherein each dimension of the multidimensional vector corresponds to either a set of queries in the n sets of queries or a set of strings in the n sets of strings.

10. The apparatus of claim 9, wherein the instructions that, when executed by at least one of the one or more processors, cause at least one of the one or more processors to determine one or more representative values corresponding to one or more intersections further cause at least one of the one or more processors to, for each intersection:
  determine n sets of weighted responses by weighting at least one set of responses from a plurality of sources to the at least one query in each set of queries based on the plurality of weights of a corresponding string in the n sets of strings; and
  determine the representative value based at least in part on the n sets of weighted responses.

11. The apparatus of claim 10, wherein the instructions that, when executed by at least one of the one or more processors, cause at least one of the one or more processors to determine the representative value based at least in part on the n sets of weighted responses further cause at least one of the one or more processors to:
  for each source in the plurality of sources, re-weighting a weighted response of that source to the target query by each weighted response of that source to the at least one query in all other sets of queries;
  compute a plurality of total quantities corresponding to the plurality of values received in response to target query by summing all re-weighted responses which correspond to the same value; and determine a representative value from the plurality of values based at least in part on the plurality of total quantities.

12. The apparatus of claim 9, wherein each set of queries comprises one or more queries and wherein each set of strings comprises one or more strings.

13. The apparatus of claim 9, wherein at least one of the one or more memories has further instructions stored thereon that, when executed by at least one of the one or more processors, cause at least one of the one or more processors to:

generate, by at least one of the one or more computing devices, a plurality of sets of representative values corresponding the to one or more intersections, wherein each set of representative values corresponds to a different value of a variable; and iteratively update, by at least one of the one or more computing devices, the one or more elements in the multidimensional vector based at least in part on the plurality of sets of representative values.

14. The apparatus of claim 13, wherein the instructions that, when executed by at least one of the one or more processors, cause at least one of the one or more processors to iteratively update the one or more elements in the multidimensional vector based at least in part on the plurality of sets of representative values further cause at least one of the one or more processors to:

update the one or more elements in the multidimensional vector to shift from a first set of representative values for an initial value of the variable to a second set of representative values for a subsequent value of the variable based at least in part on the plurality of sets of representative values.

15. The apparatus of claim 9, wherein the one or more representative values corresponding to one or more intersections comprise a plurality of representative values corresponding to a plurality of intersections, wherein the multidimensional vector comprises a plurality of elements corresponding to the plurality of intersections, and wherein at least one of the one or more memories has further instructions stored thereon that, when executed by at least one of the one or more processors, cause at least one of the one or more processors to:

filter the multidimensional vector based on one or more attributes to generate a filtered multidimensional vector, the filtered multidimensional vector including at least one representative value corresponding to at least one intersection that matches one or more values of the one or more attributes.

16. The apparatus of claim 9, wherein the instructions that, when executed by at least one of the one or more processors, cause at least one of the one or more processors to determine one or more representative values corresponding to one or more intersections further cause at least one of the one or more processors to, for at least one intersection:

determine at least one goal; and determine the at least one string corresponding to the at least one intersection based at least in part on the determined at least one goal.

17. At least one non-transitory computer-readable medium storing computer-readable instructions that, when executed by one or more computing devices, cause at least one of the one or more computing devices to:

identify n sets of queries for modeling, where n is a number greater than or equal to two;

identify n sets of strings corresponding to the n sets of queries, wherein each string comprises a plurality of weights applicable to a plurality of values in a string dimension, the string dimension for each set of strings comprising a distinct dimension from other string dimensions corresponding to other sets of strings in the n sets of strings;

determine one or more representative values corresponding to one or more intersections, wherein each intersection corresponds to a unique combination of at least one query from each set of queries in the n sets of queries and at least one string from each set of strings in the n sets of strings and wherein each representative value for each intersection comprises a value in a plurality of values received in response to a target query that is part of that intersection; and generate a multidimensional vector comprising one or more elements corresponding to the one or more intersections, wherein each element in the one or more elements comprises the representative value of a corresponding intersection and wherein each dimension of the multidimensional vector corresponds to either a set of queries in the n sets of queries or a set of strings in the n sets of strings.

18. The computer-readable medium of claim 17, wherein the instructions that, when executed by at least one of the one or more computing devices, cause at least one of the one or more computing devices to determine one or more representative values corresponding to one or more intersections further cause at least one of the one or more computing devices to, for each intersection:

determine n sets of weighted responses by weighting at least one set of responses from a plurality of sources to the at least one query in each set of queries based on the plurality of weights of a corresponding string in the n sets of strings; and determine the representative value based at least in part on the n sets of weighted responses.

19. The computer-readable medium of claim 18, wherein the instructions that, when executed by at least one of the one or more computing devices, cause at least one of the one or more computing devices to determine the representative value based at least in part on the n sets of weighted responses further cause at least one of the one or more computing devices to:

for each source in the plurality of sources, re-weighting a weighted response of that source to the target query by each weighted response of that source to the at least one query in all other sets of queries;

compute a plurality of total quantities corresponding to the plurality of values received in response to target query by summing all re-weighted responses which correspond to the same value; and determine a representative value from the plurality of values based at least in part on the plurality of total quantities.

20. The computer-readable medium of claim 17, wherein each set of queries comprises one or more queries and wherein each set of strings comprises one or more strings.

21. The computer-readable medium of claim 17, further storing computer-readable instructions that, when executed by at least one of the one or more computing devices, cause at least one of the one or more computing devices to:

generate, by at least one of the one or more computing devices, a plurality of sets of representative values corresponding the to one or more intersections, wherein each set of representative values corresponds to a different value of a variable; and iteratively update, by at least one of the one or more computing devices, the one or more elements in the multidimensional vector based at least in part on the plurality of sets of representative values.

22. The computer-readable medium of claim 21, wherein the instructions that, when executed by at least one of the one or more computing devices, cause at least one of the one or more computing devices to iteratively update the one or more elements in the multidimensional vector based at least in part on the plurality of sets of representative values further cause at least one of the one or more computing devices to:

update the one or more elements in the multidimensional vector to shift from a first set of representative values for an initial value of the variable to a second set of representative values for a subsequent value of the variable based at least in part on the plurality of sets of representative values.

23. The computer-readable medium of claim 17, wherein the one or more representative values corresponding to one or more intersections comprise a plurality of representative values corresponding to a plurality of intersections, wherein the multidimensional vector comprises a plurality of elements corresponding to the plurality of intersections, and further storing computer-readable instructions that, when executed by at least one of the one or more computing devices, cause at least one of the one or more computing devices to:

filter the multidimensional vector based on one or more attributes to generate a filtered multidimensional vector, the filtered multidimensional vector including at least one representative value corresponding to at least one intersection that matches one or more values of the one or more attributes.

24. The computer-readable medium of claim 17, wherein the instructions that, when executed by at least one of the one or more computing devices, cause at least one of the one or more computing devices to determine one or more representative values corresponding to one or more intersections further cause at least one of the one or more computing devices to, for at least one intersection:

determine at least one goal; and determine the at least one string corresponding to the at least one intersection based at least in part on the determined at least one goal.

* * * * *